(12) United States Patent
Emori

(10) Patent No.: US 11,902,692 B2
(45) Date of Patent: Feb. 13, 2024

(54) VIDEO PROCESSING APPARATUS AND VIDEO PROCESSING METHOD

(71) Applicant: Sony Group Corporation, Tokyo (JP)

(72) Inventor: Tomoyuki Emori, Tokyo (JP)

(73) Assignee: Sony Group Corporation, Tokyo (JP)

( * ) Notice: Subject to any disclaimer, the term of this patent is extended or adjusted under 35 U.S.C. 154(b) by 217 days.

(21) Appl. No.: 17/435,467

(22) PCT Filed: Mar. 13, 2020

(86) PCT No.: PCT/JP2020/011009
§ 371 (c)(1),
(2) Date: Sep. 1, 2021

(87) PCT Pub. No.: WO2020/195925
PCT Pub. Date: Oct. 1, 2020

(65) Prior Publication Data
US 2022/0232146 A1     Jul. 21, 2022

(30) Foreign Application Priority Data
Mar. 27, 2019   (JP) ................................ 2019-060838

(51) Int. Cl.
*H04N 5/222*     (2006.01)
*G06V 20/40*     (2022.01)
*H04N 23/60*     (2023.01)

(52) U.S. Cl.
CPC ........... *H04N 5/2228* (2013.01); *G06V 20/41* (2022.01); *G06V 20/48* (2022.01); *H04N 23/64* (2023.01); *G06V 2201/10* (2022.01)

(58) Field of Classification Search
USPC ....................................................... 386/240
See application file for complete search history.

(56) References Cited

U.S. PATENT DOCUMENTS 9,280,960 B1 *  3/2016  Clarke .................... G10G 1/00
10,182,271 B1 * 1/2019  Sanchez ........... H04N 21/47217
(Continued)

FOREIGN PATENT DOCUMENTS

| JP | 2006-165700 A | 6/2006 |
|----|---------------|--------|
| JP | 2014-112759 A | 6/2014 |

(Continued)

OTHER PUBLICATIONS

International Search Report dated May 26, 2020 in PCT/JP2020/011009 filed on Mar. 13, 2020, 2 pages.

*Primary Examiner* — Nigar Chowdhury
(74) *Attorney, Agent, or Firm* — Oblon, McClelland, Maier & Neustadt, L.L.P.

(57) ABSTRACT

The present disclosure relates to a video processing apparatus and a video processing method that allow each person involved to make an advance preparation more easily.
A presentation control unit controls, in such a way that, with a first scene of a captured video currently being captured used as a reference, advance information regarding a second scene is presented at a presentation timing before the second scene after the first scene, in a mode corresponding to an output destination of the captured video, the presentation of the advance information. The technology according to the present disclosure can be applied to, for example, a camera that captures video content such as a movie, a drama, or a CM.

20 Claims, 19 Drawing Sheets

(56) References Cited

U.S. PATENT DOCUMENTS

| | | | | |
|---|---|---|---|---|
| 10,771,835 B1* | 9/2020 | Chong | ............ | H04N 21/43615 |
| 11,182,431 B2* | 11/2021 | Wang | .................... | G06F 16/433 |
| 11,563,895 B2* | 1/2023 | Blanco | .................. | H04N 23/63 |
| 2004/0071441 A1* | 4/2004 | Foreman | ................ | G06F 3/0483 |
| | | | | 386/280 |
| 2008/0037826 A1* | 2/2008 | Sundstrom | ............. | G06F 16/51 |
| | | | | 386/E5.072 |
| 2009/0115908 A1* | 5/2009 | Walls | .................... | H04N 5/145 |
| | | | | 348/E5.062 |
| 2011/0041060 A1* | 2/2011 | Chien | .................... | G11B 27/34 |
| | | | | 715/716 |
| 2011/0085025 A1* | 4/2011 | Pace | .................... | H04N 13/189 |
| | | | | 348/E5.031 |
| 2011/0115790 A1* | 5/2011 | Yoo | ......................... | G06T 7/579 |
| | | | | 345/419 |
| 2012/0229475 A1* | 9/2012 | Sheridan | ................. | G06T 13/40 |
| | | | | 345/474 |
| 2013/0048855 A1* | 2/2013 | Abreo | ..................... | H04N 5/33 |
| | | | | 250/330 |
| 2014/0293006 A1* | 10/2014 | Masuda | ................. | G03B 35/10 |
| | | | | 348/43 |
| 2015/0234571 A1* | 8/2015 | Lee | ..................... | G06F 3/04883 |
| | | | | 715/721 |
| 2015/0248194 A1* | 9/2015 | Simpson | ............ | H04L 67/1097 |
| | | | | 715/719 |
| 2015/0317571 A1* | 11/2015 | Maetz | ................. | G06F 16/9024 |
| | | | | 386/278 |
| 2016/0005320 A1* | 1/2016 | deCharms | .............. | G09B 19/00 |
| | | | | 434/236 |
| 2016/0112652 A1* | 4/2016 | David | ................. | H04N 23/815 |
| | | | | 348/239 |
| 2017/0018288 A1 | 1/2017 | Mori | | |
| 2017/0026566 A1 | 1/2017 | Nitto | | |
| 2017/0236039 A1* | 8/2017 | Funderburg | .......... | G06F 3/1256 |
| | | | | 358/1.18 |
| 2018/0063471 A1* | 3/2018 | Tarvainen | ............ | H04N 9/8205 |
| 2018/0262686 A1* | 9/2018 | Haneda | ................ | H04N 23/683 |
| 2018/0268565 A1 | 9/2018 | Dolin | | |
| 2018/0330756 A1* | 11/2018 | MacDonald | .......... | G06F 16/951 |
| 2019/0045213 A1* | 2/2019 | Raut | .................... | H04N 19/573 |
| 2019/0102643 A1* | 4/2019 | Furukawa | ................ | G06T 7/11 |
| 2019/0149858 A1* | 5/2019 | Oh | .................... | H04N 21/23614 |
| | | | | 725/116 |
| 2019/0377586 A1* | 12/2019 | Faulkner | ................ | G06F 9/451 |
| 2020/0029127 A1* | 1/2020 | Garbacz | ................ | H04N 21/435 |
| 2020/0233896 A1* | 7/2020 | Boulanger | ............ | G06F 16/489 |
| 2020/0288149 A1* | 9/2020 | Mao | ..................... | H04N 19/137 |
| 2023/0061691 A1* | 3/2023 | dePaz | .................... | G06V 20/40 |

FOREIGN PATENT DOCUMENTS

| | | |
|---|---|---|
| JP | 2017-28585 A | 2/2017 |
| WO | WO-2018017878 A1 | 1/2018 |

\* cited by examiner

FIG. 8

| METADATA | WHAT IS OBTAINED | PREPARATION THAT CAN BE MADE |
|---|---|---|
| F-NUMBER | BRIGHTNESS, DEPTH OF FIELD, AND FOCUSING | CHECK TIMING TO ADJUST REFLECTOR OR EXTERNAL ILLUMINATING DEVICE |
| FOCUS POSITION | DEGREE OF FOCUS, AND WHETHER FOCUS IS FRONT FOCUS OR REAR FOCUS | CHECK TIMING AT WHICH PERSON/VEHICLE/OBJECT MOVES |
| ZOOM MAGNIFICATION OF LENS | CHANGE IN ANGLE OF VIEW, AND WHETHER WIDE-ANGLE OR TELEPHOTO | CHECK TIMING AT WHICH NEARBY/DISTANT OBJECT OR PERSON STARTS TO MOVE |
| ELECTRONIC ZOOM MAGNIFICATION | CHANGE IN ANGLE OF VIEW, AND WHETHER WIDE-ANGLE OR TELEPHOTO | CHECK TIMING AT WHICH NEARBY/DISTANT OBJECT OR PERSON STARTS TO MOVE |
| COLOR TEMPERATURE | COLOR TEMPERATURE, INDOOR/OUTDOOR, AND WEATHER | CHECK TIMING TO SWITCH BETWEEN STAGE LIGHTING AND INDOOR/OUTDOOR LIGHT SOURCE |
| Knee POINT AND Knee SLOPE | HOW IMAGE OF HIGH LUMINANCE PORTION WILL LOOK | CHECK TIMING TO ADJUST REFLECTOR OR EXTERNAL ILLUMINATING DEVICE |
| GAIN | GAIN SETTING (BRIGHT OR DARK, OR NOISE) | CHECK TIMING TO ADJUST REFLECTOR OR EXTERNAL ILLUMINATING DEVICE |
| FILTER (ND AND CC) | FILTER DENSITY (BRIGHT OR DARK, OR COLOR TEMPERATURE) | CHECK TIMING TO ADJUST REFLECTOR OR EXTERNAL ILLUMINATING DEVICE |
| TIME CODES AND TIME | TIME CODES AND TIME | PRESENT DIFFERENCE BETWEEN CURRENT IMAGING TIME AND TIME AT WHICH ADVANCE INFORMATION IS TO BE DISPLAYED |
| SOUND INFORMATION | SOUND LEVEL | CHECK TIMING TO ADD/REMOVE SOUND |
| GPS INFORMATION | IMAGING POSITION | AVOID INTERFERING WITH IMAGING, AND PREPARE SUBJECT TO BE IMAGED |
| GYRO INFORMATION | IMAGING DIRECTION | AVOID INTERFERING WITH IMAGING, AND PREPARE SUBJECT TO BE IMAGED |
| FACE INFORMATION | WHETHER THERE IS FACE, POSITION OF FACE, GENDER, AND RACE | CHECK TIMING AT WHICH PERFORMER APPEARS/DISAPPEARS |

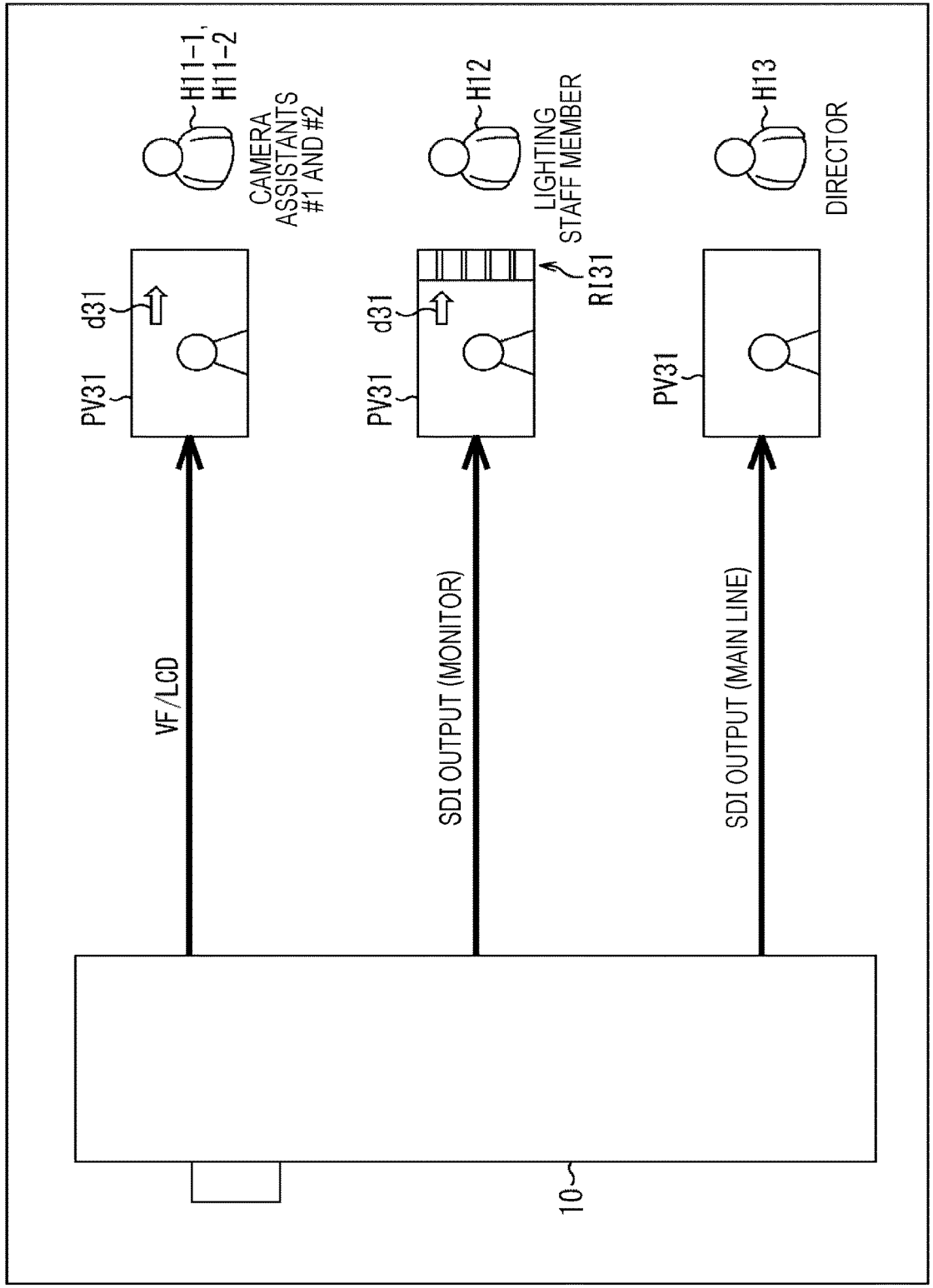

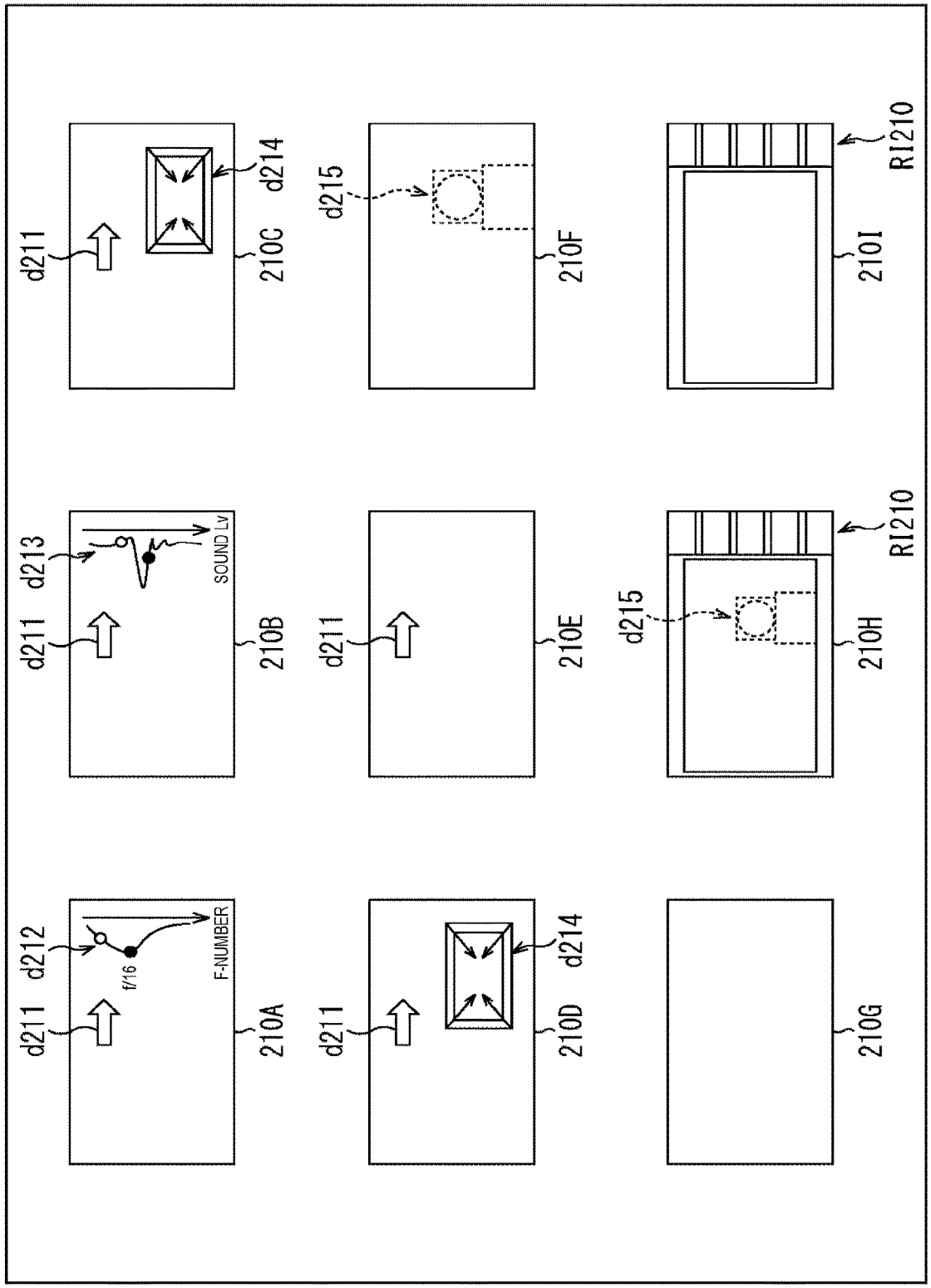

FIG. 15

| FILM STAFF MEMBER | METADATA AS REFERENCE | PREPARATION THAT CAN BE MADE |
|---|---|---|
| DIRECTOR OF PHOTOGRAPHY (IMAGE QUALITY CHECK) | F-NUMBER, LUMINANCE, AND IMAGING DIRECTION OF PAN/TILT | CHECK TIMING TO CHANGE IRIS OF LENS OR GAIN, AND CHECK TIMING TO CHANGE IMAGING DIRECTION OF CAMERA |
| CAMERA OPERATOR | GPS, GYRO, LENS ZOOM MAGNIFICATION, AND ELECTRONIC ZOOM MAGNIFICATION | CHECK TIMING TO PAN/TILT CAMERA, AND CHECK TIMING TO OPERATE LENS ZOOM AND ELECTRONIC ZOOM |
| CAMERA ASSISTANT #1 (FocusPuller, MOVEMENT OF EQUIPMENT SUCH AS MONITOR) | FOCUS POSITION, GPS, GYRO, LENS ZOOM MAGNIFICATION, AND ELECTRONIC ZOOM MAGNIFICATION | CHECK TIMING TO PAN/TILT CAMERA, CHECK TIMING TO OPERATE LENS ZOOM AND ELECTRONIC ZOOM, CHECK TIMING TO CHANGE POSITION OF CAMERA, AND CHECK TIMING TO CHANGE FOCUS |
| CAMERA ASSISTANT #2 (LENS REPLACEMENT, IMAGING CONDITION MEMO, MONITOR MOVEMENT, AND IMAGING MEDIUM MANAGEMENT) | GPS, GYRO, LENS ZOOM MAGNIFICATION, AND ELECTRONIC ZOOM MAGNIFICATION | CHECK TIMING TO PAN/TILT CAMERA, CHECK TIMING TO OPERATE LENS ZOOM AND ELECTRONIC ZOOM, AND CHECK TIMING TO CHANGE POSITION OF CAMERA |
| PERSON IN CHARGE OF CAMERA EQUIPMENT (CABLE, BATTERY, VARIOUS ADAPTERS, ETC.) | GPS AND GYRO | CHECK TIMING TO PAN/TILT CAMERA, AND CHECK TIMING TO CHANGE POSITION OF CAMERA |
| SCRIPT SUPERVISOR | FACE INFORMATION | CHECK CONNECTIONS BETWEEN CUTS IN ADVANCE |
| SOUND STAFF MEMBER (SEPARATE RECORDING) | SOUND INFORMATION AND IMAGING DIRECTION OF PAN/TILT | CHECK TIMING TO PREVENT EXTERNAL MICROPHONE FROM BEING CAPTURED IN VIDEO |
| PERFORMER | GYRO, GPS, FACE INFORMATION, AND ZOOM MAGNIFICATION | CHECK TIMING TO APPEAR/DISAPPEAR IN/FROM VIDEO |
| CRANE/DOLLY OPERATOR | GYRO, GPS, FACE INFORMATION, AND ZOOM MAGNIFICATION | CHECK TIMING TO MOVE CRANE OR DOLLY |
| LIGHTING | F-NUMBER, LUMINANCE, AND COLOR TEMPERATURE | CHECK TIMING TO OPERATE REFLECTOR OR EXTERNAL ILLUMINATING DEVICE |
| PROMPTER | VOICE AND FACE INFORMATION | CHECK TIMING TO PROMPT PERFORMER |
| PROP/ART STAFF MEMBER | GPS AND GYRO | CHECK TIMING TO MOVE PROP/ART AS SUBJECT |

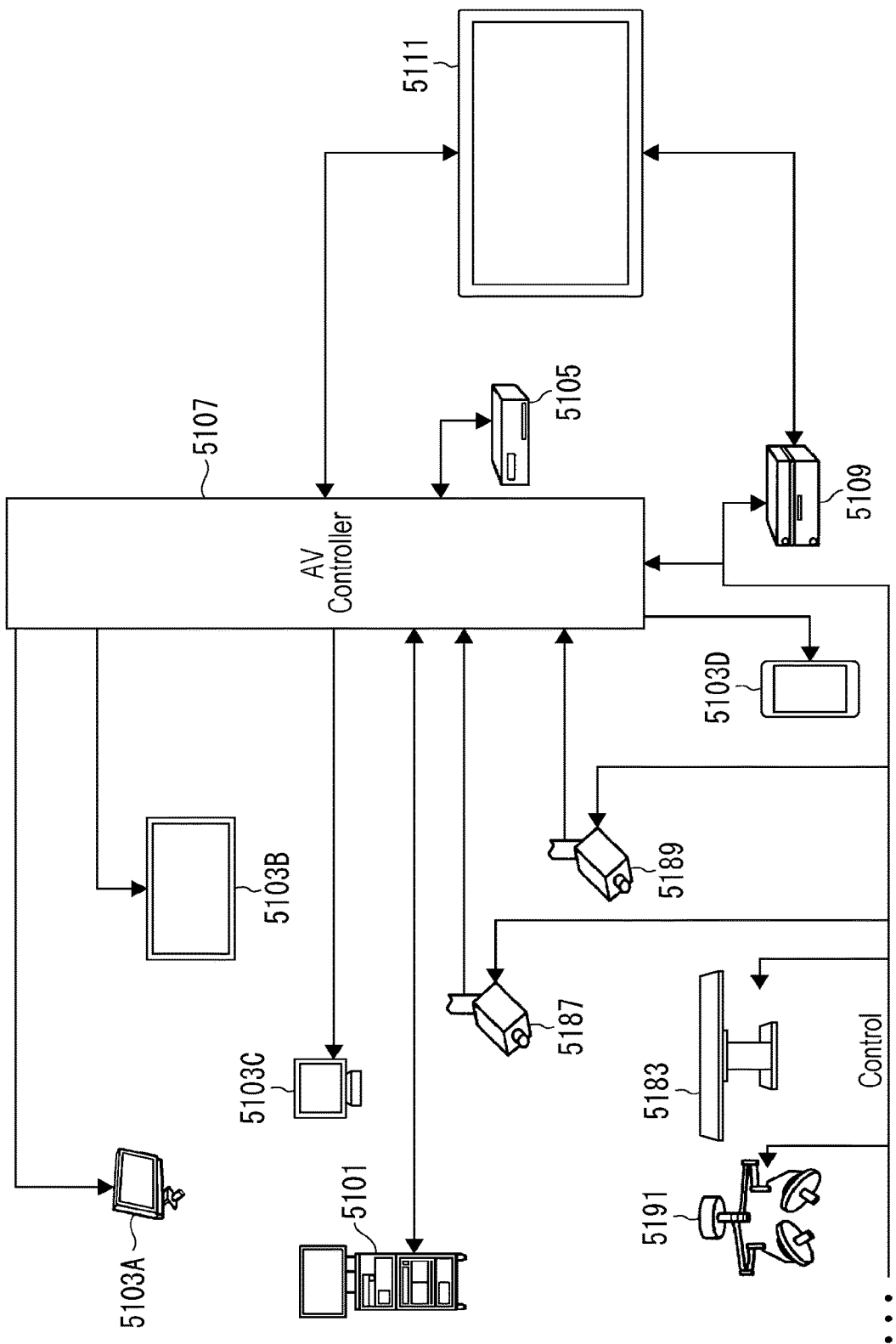

VIDEO PROCESSING APPARATUS AND VIDEO PROCESSING METHOD

TECHNICAL FIELD

The present disclosure relates to a video processing apparatus and a video processing method, and more particularly, to a video processing apparatus and a video processing method that allow each person involved to make an advance preparation more easily.

BACKGROUND ART

Video content such as a movie, a drama, or a commercial message (CM) is generally produced on the basis of a scenario prepared in advance, and filming (take) is performed a plurality of times in accordance with the scenario. At a filming location, depending on the video content, a large number of film staff members, such as several tens of members or more than 100 members, may be involved in filming.

At the filming location, there are some cases in which the scenario is not sufficiently shared among the film staff members, or the scenario is updated each time rehearsal filming is performed. In such a case, since not all the film staff members sufficiently understand the next scene, the film staff members may fail to operate their equipment in synchronization with each other, and this may result in re-shooting of the scene.

To cope with this problem, the film staff members prepare for the next scene by verbally communicating with each other by wireless voice communication about preparations to be made for the next scene, or predicting the next scene while checking a video output from a camera.

Furthermore, Patent Document 1 discloses a technology in which, when a movement of an imaging device is stored in a rehearsal mode and filming is performed in a reproduction imaging mode, a symbol for guiding the movement of the imaging device is displayed on the basis of the stored movement of the imaging device.

CITATION LIST

Patent Document

Patent Document 1: Japanese Patent Application Laid-Open No. 2014-112759

SUMMARY OF THE INVENTION

Problems to be Solved by the Invention

Except for a case where the scenario is simple, displaying information that indicates the outline of the next scene on the monitor in advance allows the film staff members to make advance preparations more easily.

However, Patent Document 1 does not disclose that necessary information is presented for each person involved at the filming location, such as a sound staff member who handles a microphone or a lighting staff member who operates lighting equipment, other than staff in charge of the camera.

The present disclosure has been made in view of such circumstances, and is intended to allow each person involved to make an advance preparation more easily.

Solutions to Problems

A video processing apparatus of the present disclosure includes a presentation control unit that controls, in such a way that, with a first scene of a captured video currently being captured used as a reference, advance information regarding a second scene is presented at a presentation timing before the second scene after the first scene, in a mode corresponding to an output destination of the captured video, the presentation of the advance information.

A video processing method of the present disclosure includes controlling, by a video processing apparatus, in such a way that, with a first scene of a captured video currently being captured used as a reference, advance information regarding a second scene is presented at a presentation timing before the second scene after the first scene, in a mode corresponding to an output destination of the captured video, the presentation of the advance information.

In the present disclosure, advance information regarding a second scene is presented at a presentation timing, with a first scene of a captured video currently being captured used as a reference, before the second scene after the first scene, in a mode corresponding to an output destination of the captured video.

BRIEF DESCRIPTION OF DRAWINGS

FIG. 8 is a diagram illustrating an example of metadata analysis.

FIG. 9 is a diagram illustrating a use case of the technology according to the present disclosure.

FIG. 14 is a diagram illustrating an example of presentation of the advance information at the filming location.

FIG. 15 is a diagram illustrating an example of an advance preparation for each film staff member.

FIG. 16 is a diagram schematically illustrating an overall configuration of an operating room system.

MODE FOR CARRYING OUT THE INVENTION

A mode for carrying out the present disclosure (hereinafter referred to as "embodiment") will be described below. Note that the description will be made in the order below.

1. Outline of technology according to present disclosure
2. Configuration and operation of video processing apparatus
3. Use cases
4. Example of presentation of advance information at filming location
5. Effects
6. Application example

1. Outline of Technology According to Present Disclosure

Figure 1:
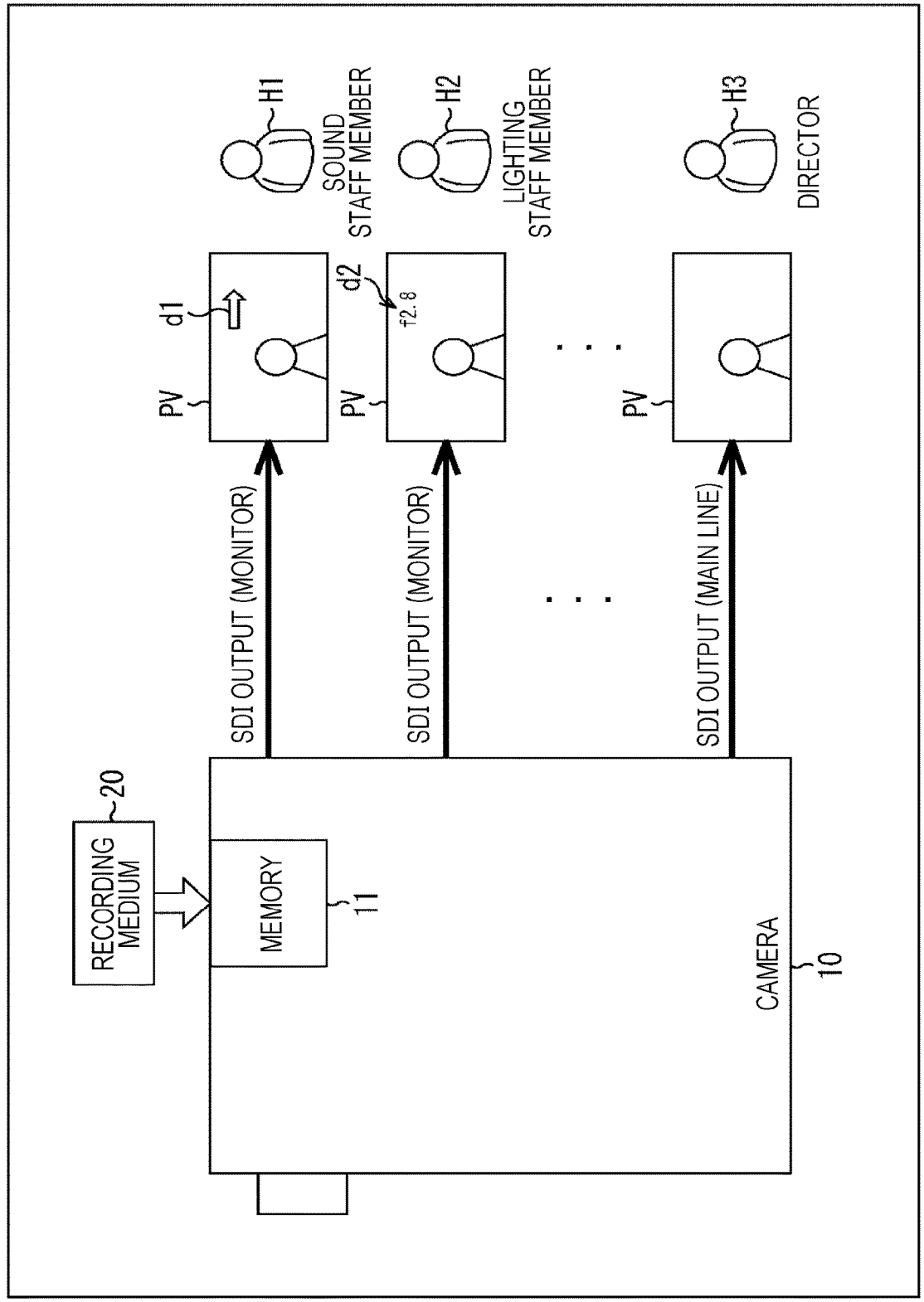
FIG. 1 is a diagram illustrating an example of a video processing system to which the technology according to the present disclosure is applied.

FIG. 1 is a diagram illustrating an example of a video processing system to which the technology according to the present disclosure (the present technology) is applied.

A camera 10 in FIG. 1 captures images for production of video content such as a movie, a drama, or a CM. The camera 10 includes a memory 11, and a rehearsal video captured in a rehearsal filming performed before an actual filming is read into the memory 11 from a recording medium 20 where the rehearsal video is stored.

Furthermore, the camera 10 outputs an actual performance video PV currently being captured in the actual filming to output systems that support a serial digital interface (SDI). In the example in FIG. 1, the actual performance video PV is displayed on monitors for checking, one for each of a sound staff member H1, a lighting staff member H2, . . . , and a director H3.

In the actual filming, filming is performed under substantially the same conditions and settings as those of the rehearsal video, but there is a case where the actual filming is performed again due to a slight difference in operation between performers or film staff members.

In the actual filming, the members, each having their own roles such as a camera angle, recording of voice with an external microphone for sound recording, illumination, operation of a camera platform or a crane/dolly on which a camera is mounted, and movement of a performer, operate in harmony with each other so that high-quality video content is produced.

In the video processing system of the present technology, each person involved (a film staff member and a performer) checks advance information presented on the monitor of each person involved, and this allows each person involved to make an advance preparation more easily. The advance information is information that prompts each person involved corresponding to an output destination of the actual performance video to perform an operation for a scene after a predetermined time, and is generated by the camera 10 analyzing the rehearsal video read into the memory 11.

Specifically, in the monitor checked by the sound staff member H1, advance information d1 indicating that the camera is supposed to pan to the right after a predetermined time is presented on the actual performance video PV output from the camera 10. Furthermore, on the monitor checked by the lighting staff member H2, advance information d2 indicating an F-number after the predetermined time is presented on the actual performance video PV output from the camera 10.

Such advance information allows each person involved to make the advance preparation to perform the operation for the scene after the predetermined time.

Note that, since the director H3 only needs to be able to concentrate on the video itself, none of the pieces of advance information is presented on the actual performance video PV displayed on the monitor checked by the director H3.

Figure 2:
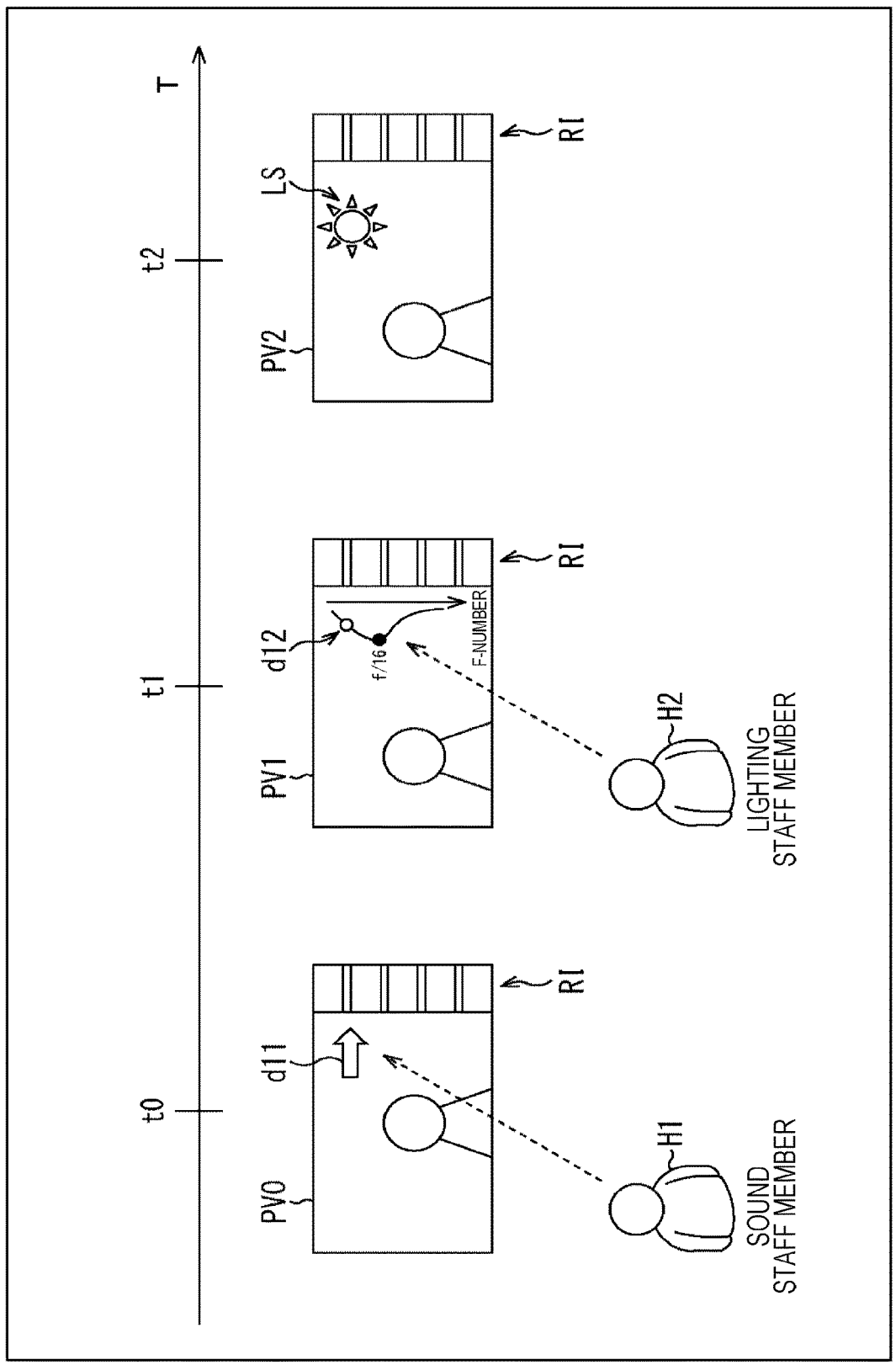
FIG. 2 is a diagram illustrating an example of an advance preparation to be made by a film staff member.

FIG. 2 is a diagram illustrating an example in which the sound staff member H1 and the lighting staff member H2 make the advance preparations by checking the advance information.

In a case of recording voice with the external microphone instead of a microphone built in the camera, the sound staff member H1 needs to always pay attention to prevent the external microphone from being captured in the actual performance video.

As illustrated in FIG. 2, in a case where there is a scene in which the camera pans to the right at time t1, advance information d11 in the shape of a right arrow indicating that the camera is supposed to pan to the right is presented at time t0 on an actual performance video PV0 being checked by the sound staff member H1.

This allows the sound staff member H1 to make an advance preparation to prevent the external microphone from being captured on the right side of the actual performance video.

The lighting staff member H2 adjusts the way of applying light to a subject with a reflector or illuminates the subject with lighting equipment.

As illustrated in FIG. 2, in a case where there is a scene where a subject (performer) is illuminated with intense light from a light source LS at time t2, advance information d12 indicating that an iris is supposed to be narrowed so that the F-number becomes f/16 is presented, at time t1, on an actual performance video PV1 being checked by the lighting staff member H2. The advance information d12 is indicated as a graph representing a change in the F-number with the downward direction in the figure as a time axis direction. A white dot on a curve of the graph represents the current F-number, and a black dot represents the F-number (=f/16) at time t3.

This allows the lighting staff member H2 to make an advance preparation to apply light to the face of the subject with the reflector in order to avoid a decrease in luminance of the face of the subject due to the iris being narrowed.

Note that, in the example in FIG. 2, a plurality of representative frame images RI representing upcoming scenes is presented on the right edges of the actual performance videos PV0 and PV1 and an actual performance video PV2. The representative frame images RI are specific frame images extracted from the rehearsal video. The representative frame images RI may be, for example, frame images at timings of scene changes or dramatic movements of the subject, or may be frame images, one for every predetermined number of frames. In the example in FIG. 2, the plurality of representative frame images RI is presented, but only one representative frame image RI may be presented.

Hereinafter, a configuration and an operation of a video processing apparatus of the present technology that achieves the presentation of the advance information described above will be described.

2. Configuration and Operation of Video Processing Apparatus (Block Configuration)

Figure 3:
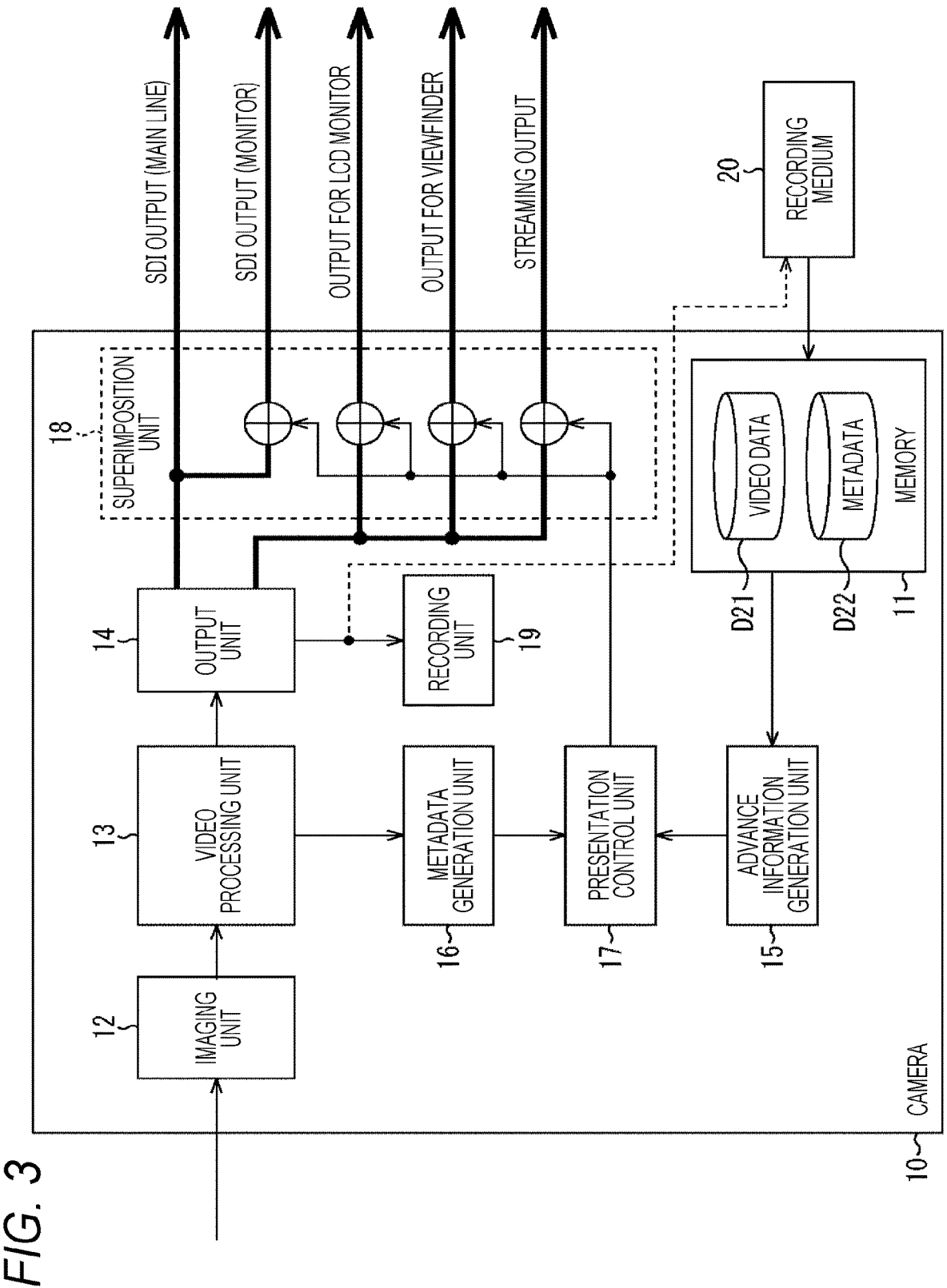
FIG. 3 is a block diagram illustrating a functional configuration example of a camera.

FIG. 3 is a block diagram illustrating a functional configuration example of the camera 10 as the video processing apparatus of the present technology.

The camera 10 in FIG. 3 includes the memory 11, an imaging unit 12, a video processing unit 13, an output unit 14, an advance information generation unit 15, a metadata generation unit 16, a presentation control unit 17, a superimposition unit 18, and a recording unit 19.

The memory 11 reads and stores video data D21 and its metadata D22 of a recorded video (rehearsal video) captured and recorded in advance and stored in the recording medium 20. In the rehearsal video, the metadata D22 is recorded together with the video data D21 for each frame, but the video data D21 and the metadata D22 are separately stored in the memory 11. The metadata D22 contains time information, a camera parameter, information regarding the posture of the camera, information regarding the position of the camera, sound information, and the like regarding the rehearsal video.

The imaging unit 12 is constituted by an optical system such as a zoom lens or an iris, and a solid-state imaging element such as a complementary metal-oxide-semiconductor (CMOS) image sensor or a charge-coupled device (CCD) image sensor. The imaging unit 12 acquires a captured video (actual performance video) by imaging a subject, and supplies an analog video signal representing the captured video to the video processing unit 13.

The video processing unit 13 digitally converts the video signal from the imaging unit 12, performs predetermined video processing for adjusting a gain, a luminance, a color temperature, and the like to generate video data, and supplies the video data to the output unit 14.

The output unit 14 converts the video data from the video processing unit 13 into a format for each output system, such as an SDI output, an output for a liquid crystal display (LCD) monitor, an output for a viewfinder, or a streaming output, and outputs the converted video data to a display device serving as a corresponding output destination.

The advance information generation unit 15 generates advance information as described with reference to FIGS. 1 and 2 on the basis of the video data D21 and the metadata D22 of the rehearsal video stored in the memory 11. Furthermore, the advance information generation unit 15 obtains a presentation timing at which the generated advance information is to be presented on the basis of the video data D21 and the metadata D22 of the rehearsal video stored in the memory 11. The generated advance information is supplied to the presentation control unit 17 together with the video data D21, the metadata D22, and information indicating the presentation timing.

The metadata generation unit 16 generates metadata corresponding to the video data of the actual performance video generated by the video processing unit 13. The metadata contains time information, a camera parameter, information regarding the posture of the camera 10, information regarding the position of the camera 10, and the like regarding the actual performance video. The generated metadata is supplied to the presentation control unit 17 together with the video data from the video processing unit 13.

The presentation control unit 17 compares the rehearsal video and the actual performance video to control presentation of the advance information.

Specifically, the presentation control unit 17 compares the video data D21 and the metadata D22 of the rehearsal video from the advance information generation unit 15 with the video data and the metadata of the actual performance video from the metadata generation unit 16. As a result of comparison between the rehearsal video and the actual performance video, the presentation control unit 17 controls presentation of the advance information such that the advance information is presented in a mode corresponding to the output destination (output system) of the actual performance video at the above-described presentation timing. More specifically, the presentation control unit 17 controls the superimposition unit 18 to control superimposition of the advance information on the video (video data) for each output system output from the output unit 14.

On the basis of the control from the presentation control unit 17, the superimposition unit 18 superimposes the advance information on the video for each output system output from the output unit 14 so that the advance information is presented at the above-described presentation timing.

The recording unit 19 is constituted by, for example, a recording medium such as a magnetic tape or a hard disk. The recording unit 19 records a video output from the output unit 14. The video output from the output unit 14 may be recorded on the recording medium 20 inserted in a slot provided in the camera 10.

With a configuration as described above, the camera 10 can generate advance information on the basis of a rehearsal video and present the advance information on an actual performance video at an appropriate timing. Hereinafter, an operation of the camera 10 having the above-described configuration will be described.

(Flow of Advance Information Generation Processing)

Figure 4:
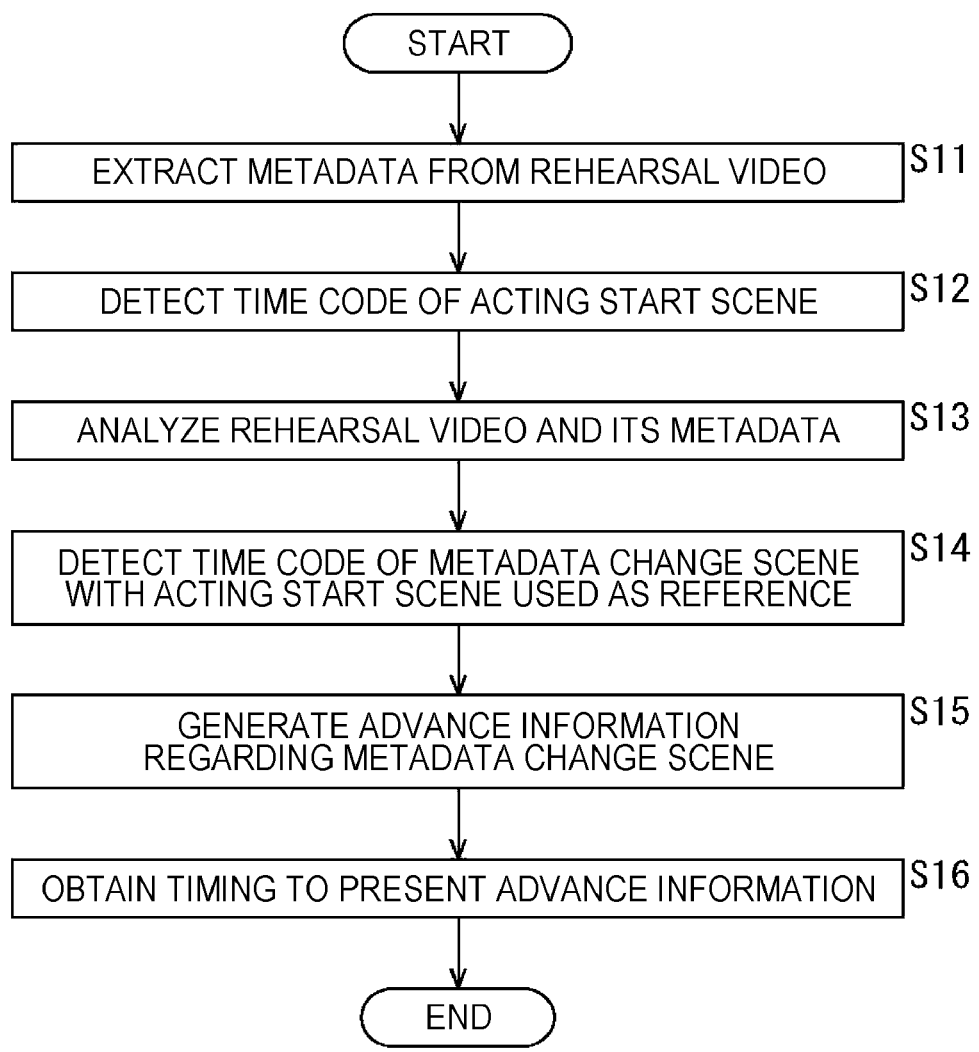
FIG. 4 is a flowchart illustrating a flow of advance information generation processing.

First, a flow of advance information generation processing by the camera 10 will be described with reference to a flowchart in FIG. 4. The processing in FIG. 4 is started when, after a rehearsal video stored in the recording medium 20 has been read into the memory 11, generation of advance information is instructed by a user operation, for example.

In step S11, the advance information generation unit 15 extracts the metadata D22 from the video data D21 of the rehearsal video stored in the memory 11.

In step S12, the advance information generation unit 15 detects a time code of an acting start scene from the video data D21 of the rehearsal video stored in the memory 11. Time codes are time information indicating temporal positions of frame images in the entire rehearsal video.

The acting start scene is a scene at which a specific cut starts in the rehearsal video. The acting start scene is, for example, a scene in which a director's utterance "Action" has been detected in the rehearsal video, or a scene in which an instruction to start acting by a clapperboard constituted by clappers for making a sound and a board for indicating shot information has been detected as a video or a sound.

In step S13, the advance information generation unit 15 analyzes the video data D21 and the metadata D22 of the rehearsal video starting from the acting start scene. Here, it is sufficient if at least the metadata D22 of the rehearsal video starting from the acting start scene is analyzed, and the video data D21 of the rehearsal video does not necessarily need to be analyzed.

When a change in the metadata D22 is detected by the analysis of the video data D21 and the metadata D22, in step S14, the advance information generation unit 15 detects a time code of a metadata change scene with the acting start scene used as a reference.

In step S15, the advance information generation unit 15 generates advance information regarding the metadata change scene on the basis of the changed metadata. The advance information presents a change in the metadata of the actual performance video in the metadata change scene to the user corresponding to the output destination of the actual performance video. The advance information is generated for each output system to which the actual performance video is output as display information including at least one of a character including a number, a symbol, or a figure.

Then, in step S16, the advance information generation unit 15 obtains a timing to present the advance information.

Figure 5:
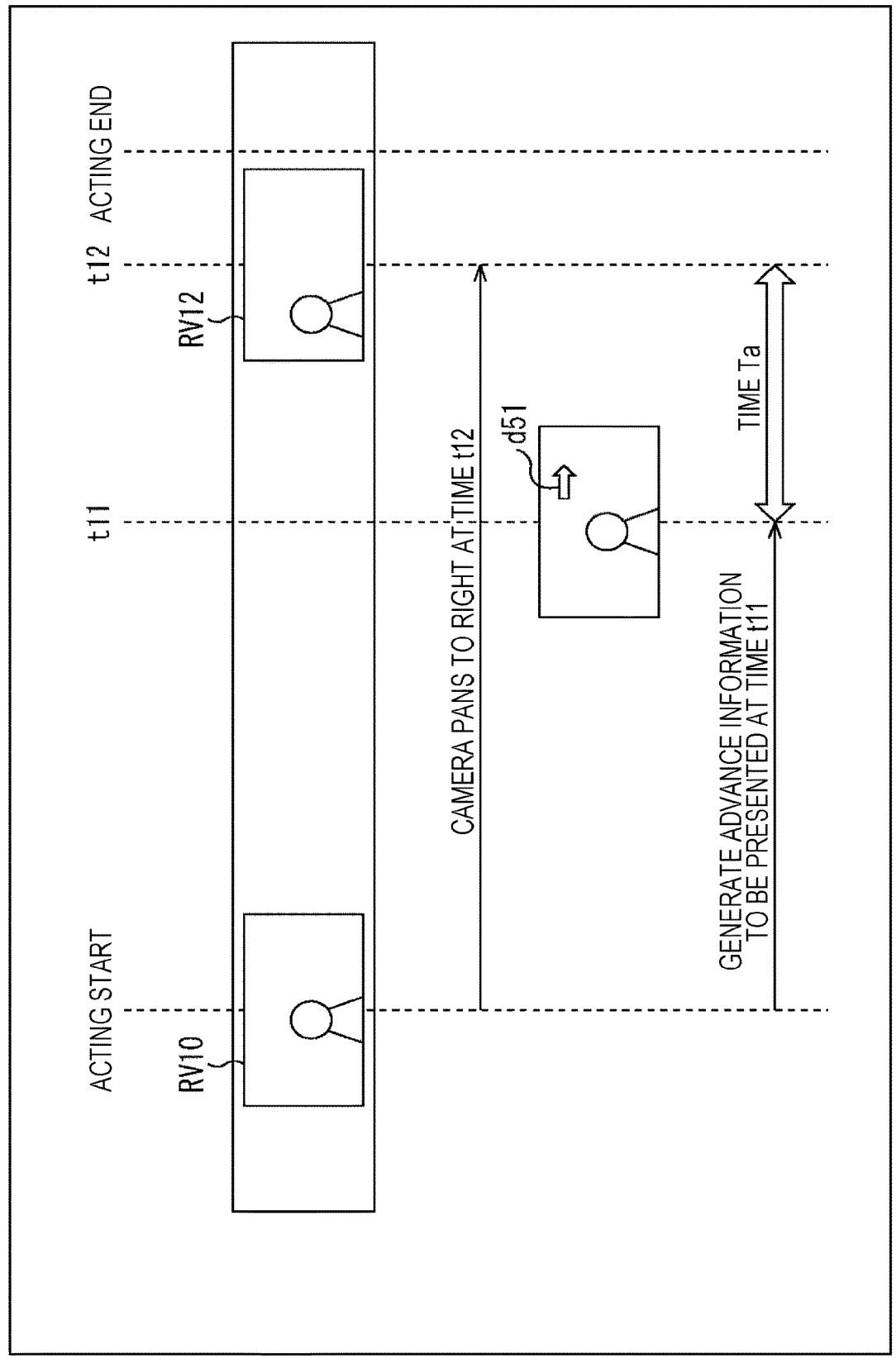
FIG. 5 is a diagram illustrating an example of generation of the advance information.

For example, as illustrated in FIG. 5, in a case where the camera pans to the right at time t12 with an acting start scene RV10 used as a reference in the rehearsal video, the scene at the time t12 is identified as a metadata change scene RV12.

The metadata change scene RV12 is identified by, for example, analysis of gyro information in the metadata of the rehearsal video. Alternatively, the metadata change scene RV12 may be identified on the basis of, for example, a result of analyzing a movement of the rehearsal video itself.

When the metadata change scene RV12 has been identified, advance information to be presented at time t11, which is before the time t12 of the metadata change scene RV12, is generated.

In the example in FIG. 5, advance information d51 indicating that the camera is supposed to pan to the right at time t12 is generated. In addition to the advance information d51, advance information in a mode corresponding to the user who checks the monitor serving as the output destination of the actual performance video is generated.

Furthermore, the time t11, which is the timing to present the advance information, is obtained by going back by a time Ta from the time t12 of the metadata change scene RV12. The length of the time Ta is a preset time length, or may be set to a different time length for each user who checks the monitor serving as the output destination of the actual performance video. That is, the time t11, which is the timing to present the advance information, may be set to a different timing for each output destination of the actual performance video.

Through processing as described above, advance information is generated, and the timing to present the presentation information in the actual performance video is obtained.

Note that, at a filming location, rehearsal filming may include a plurality of takes. In this case, for generation of the advance information, a rehearsal video captured in rehearsal filming of the previous take may be used, or a rehearsal video of a take to be used may be selected on a menu screen.

(Flow of Advance Information Presentation Processing)

Figure 6:
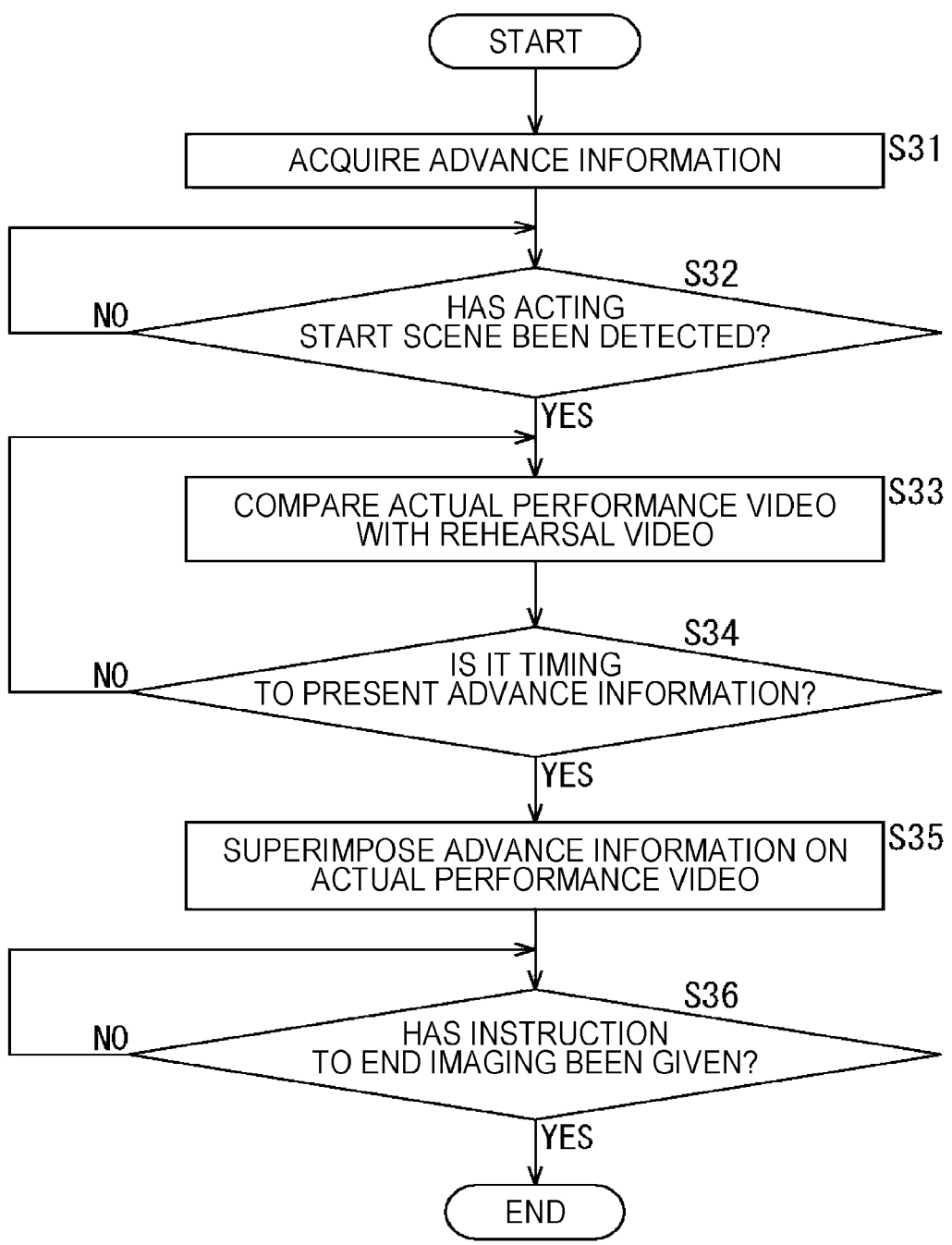
FIG. 6 is a flowchart illustrating a flow of the advance information presentation processing.

Next, a flow of advance information presentation processing by the camera 10 will be described with reference to a flowchart in FIG. 6. The processing in FIG. 6 is started when capturing of an actual performance video is started. When the capturing of the actual performance video is started, the metadata generation unit 16 starts to generate metadata corresponding to video data of the actual performance video generated by the video processing unit 13, and supplies the metadata to the presentation control unit 17 together with a frame image of the actual performance video.

In step S31, the presentation control unit 17 acquires, from the advance information generation unit 15, advance information and information indicating the timing to present the advance information, together with video data and metadata of a rehearsal video.

In step S32, the presentation control unit 17 determines whether or not an acting start scene has been detected in the actual performance video from the metadata generation unit 16. The processing in step S32 is repeated until it is determined that an acting start scene has been detected in the actual performance video.

Then, when it is determined that an acting start scene has been detected in the actual performance video, the processing proceeds to step S33.

In step S33, the presentation control unit 17 compares the actual performance video with the rehearsal video. Specifically, the presentation control unit 17 starts to compare the metadata of the frame images starting from the acting start scene in the actual performance video with the metadata of the frame images starting from the acting start scene in the rehearsal video.

Here, at least the time codes of the frame images starting from the acting start scene in the actual performance video are compared with the time codes of the frame images starting from the acting start scene in the rehearsal video. This makes it possible to identify a scene, in the actual performance video, corresponding to each scene in the rehearsal video.

Furthermore, other than the time codes, the camera parameter, the information regarding the posture of the camera, the information regarding the position of the camera, the sound information, and the like may be used for comparison between the metadata of the frame images of the actual performance video and that of the rehearsal video.

Moreover, in addition to the metadata of the frame images of the actual performance video and that of the rehearsal video, the frame images (video data) of the actual performance video and those of the rehearsal video may be compared. This makes it possible to identify a scene more reliably, in the actual performance video, corresponding to each scene in the rehearsal video.

While the actual performance video and the rehearsal video are compared, in step S34, the presentation control unit 17 determines whether or not it is a timing to present the advance information. The comparison between the actual performance video and the rehearsal video (processing in step S33) is repeated until it is determined that it is the timing to present the advance information.

Then, when it is determined that it is the presentation timing of the advance information, the processing proceeds to step S35.

In step S35, the presentation control unit 17 controls the superimposition unit 18 to superimpose the advance information on the video for each output system output from the output unit 14.

Thereafter, in step S36, it is determined whether or not an instruction to end imaging has been given. If it is determined that an instruction to end imaging has been given, the processing in FIG. 6 ends.

Figure 7:
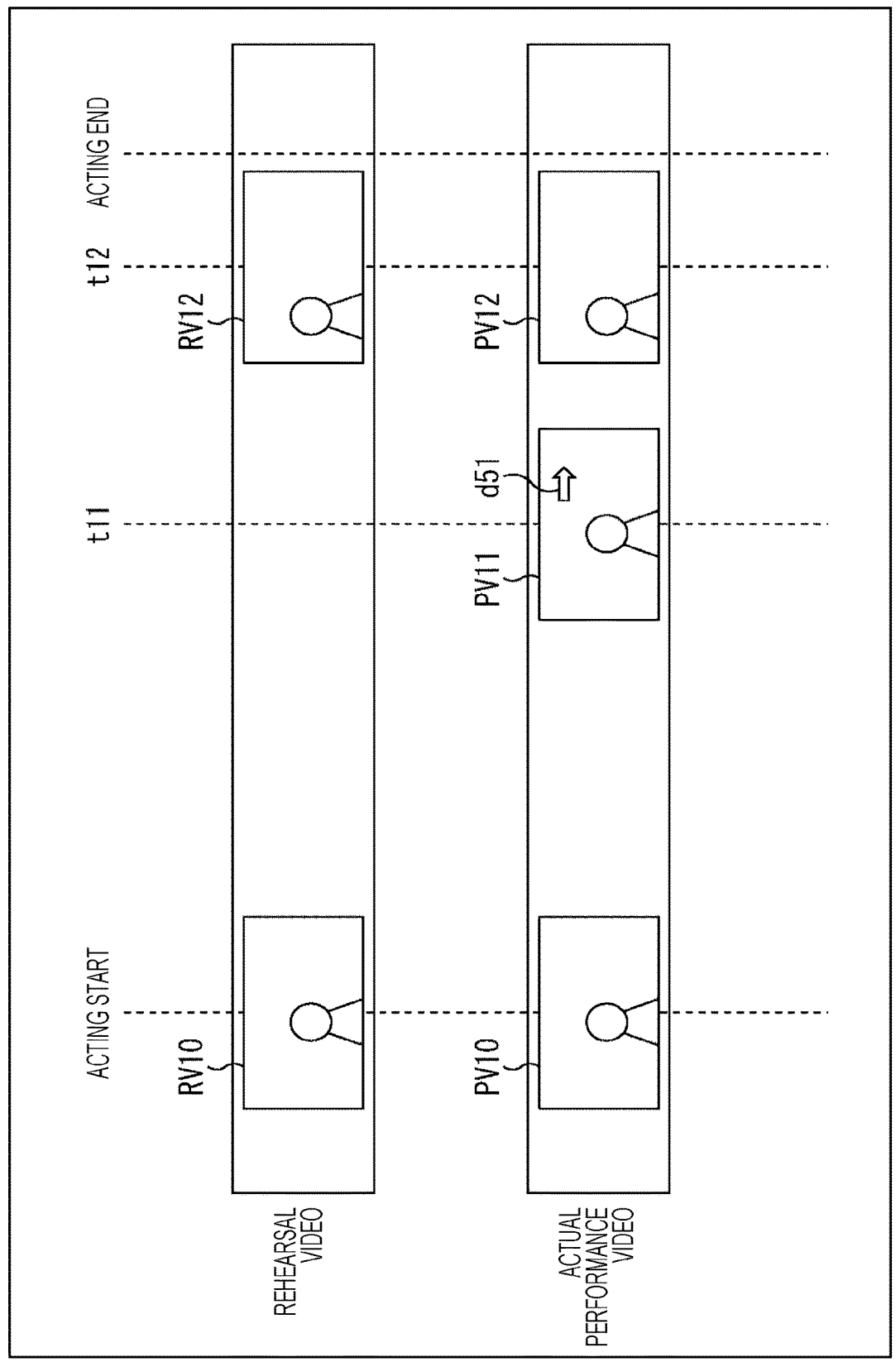
FIG. 7 is a diagram illustrating an example of presentation of the advance information.

For example, as illustrated in FIG. 7, when an acting start scene PV10 corresponding to the acting start scene RV10 of the rehearsal video is detected in the actual performance video, a comparison between the actual performance video and the rehearsal video is started.

At time t11, which is the timing to present the advance information, with the acting start scene PV10 used as a reference, the advance information d51 indicating that the camera is supposed to pan to the right at time t12 is superimposed on a scene PV11 at time t11 in the actual performance video.

Thereafter, in the actual performance video, the camera pans to the right at a scene PV12 at time t12, and the acting ends.

In the above-described example, the gyro information of the rehearsal video is analyzed for generation of the advance information for making an advance preparation to prevent the external microphone from being captured on the right side of the actual performance video. Alternatively, it is possible to analyze various types of metadata of the rehearsal video to generate advance information for making a variety of advance preparations.

FIG. 8 is a diagram illustrating an example of metadata analysis.

For example, analyzing the F-number, which is one of the camera parameters of the rehearsal video, shows a brightness, a depth of field, and focusing. This makes it possible to generate advance information for checking the timing to adjust a reflector or an external illuminating device.

Analyzing a focus position, which is one of the camera parameters of the rehearsal video, shows a degree of focus and whether the focus is front focus or rear focus. This makes it possible to generate advance information for checking the timing at which a person, a vehicle, or an object moves.

Analyzing a zoom magnification of a lens, which is one of the camera parameters of the rehearsal video, shows a change in angle of view and whether wide-angle or telephoto. This makes it possible to generate advance information for checking the timing at which a nearby/distant object or person starts to move.

Analyzing an electronic zoom magnification, which is one of the camera parameters of the rehearsal video, shows a change in angle of view and whether wide-angle or telephoto. This makes it possible to generate advance information for checking the timing at which a nearby/distant object or person starts to move.

Analyzing the color temperature, which is one of the camera parameters of the rehearsal video, shows not only the color temperature but also whether indoor or outdoor, and weather. This makes it possible to generate advance information for checking the timing to switch between stage lighting and an indoor/outdoor light source.

Analyzing a knee point and a knee slope, which are one of the camera parameters of the rehearsal video, shows how an image of a high luminance portion will look. This makes it possible to generate advance information for checking the timing to adjust a reflector or an external illuminating device.

Analyzing the gain, which is one of the camera parameters of the rehearsal video, shows a gain setting (bright or dark, or noise). This makes it possible to generate advance information for checking the timing to adjust a reflector or an external illuminating device.

Analyzing whether an ND filter and a CC filter are used, which is one of the camera parameters of the rehearsal video, shows a filter density (bright or dark, or color temperature). This makes it possible to generate advance information for checking the timing to adjust a reflector or an external illuminating device.

Analyzing time codes and the time, which are one of the pieces of time information of the rehearsal video, makes it possible to generate advance information for presenting a difference between the current imaging time and the time at which the advance information is to be displayed.

Analyzing sound information of the rehearsal video shows a sound level. This makes it possible to generate advance information for checking the timing to add sound or remove sound.

Analyzing global positioning system (GPS) information, which is one of pieces of the information regarding the position of the camera at the time of capturing the rehearsal video, shows an imaging position. This makes it possible to generate advance information for avoiding interfering with the imaging, and advance information for preparing a subject to be imaged.

As described above, analyzing the gyro information, which is one of pieces of the information regarding the posture of the camera at the time of capturing the rehearsal video, shows an imaging direction. This makes it possible to generate advance information for avoiding interfering with the imaging, and advance information for preparing a subject to be imaged.

Analyzing the face information of the rehearsal video shows whether there is a face, the position of the face, gender, and race. This makes it possible to generate advance information for checking the timing at which a performer appears or the timing at which a performer disappears.

The advance information for making a variety of advance preparations generated as described above is presented in a mode corresponding to the output destination of the actual performance video, with detection of the acting start scene in the actual performance video as a trigger. That is, according to the above processing, it is possible to allow each person involved to make an advance preparation more easily at a filming location.

3. Use Cases

A use case of a video processing system to which the present technology is applied will be described.

(Use Case 1)

A camera 10A illustrated in FIG. 9 captures images for production of a movie. In general, a camera for producing a movie allows for an output to a plurality of output systems such as an output for a viewfinder (VF), an output for an LCD monitor, a main line SDI output, and an SDI output for a monitor. The film staff member who checks the monitor is often of a different role depending on the output system of the monitor.

In the example in FIG. 9, camera assistants H11-1 and H11-2 are checking an actual performance video PV31 output to a VF or an LCD monitor, and a lighting staff member H12 is checking the actual performance video PV31 output to an SDI monitor. Furthermore, a director H13 is checking the actual performance video PV31 displayed on a main line SDI monitor.

Advance information d31 indicating that the camera is supposed to pan to the right after a predetermined time is superimposed on the actual performance video PV31 being checked by the camera assistants H11-1 and H11-2. This allows the camera assistants H11-1 and H11-2 to make an advance preparation for panning the camera to the right after the predetermined time.

The advance information d31 indicating that the camera is supposed to pan to the right after the predetermined time is also superimposed on the actual performance video PV31 being checked by the lighting staff member H12. This allows the lighting staff member H12 to make an advance preparation to perform an operation for the camera panning to the right after the predetermined time. Note that representative frame images RI31 representing upcoming scenes are superimposed on the right edge of the actual performance video PV31 being checked by the lighting staff member H12.

None of the pieces of advance information is superimposed on the actual performance video PV31 being checked by the director H13. This allows the director H13 to concentrate on the actual performance video itself being captured.

(Use Case 2)

Figure 10:
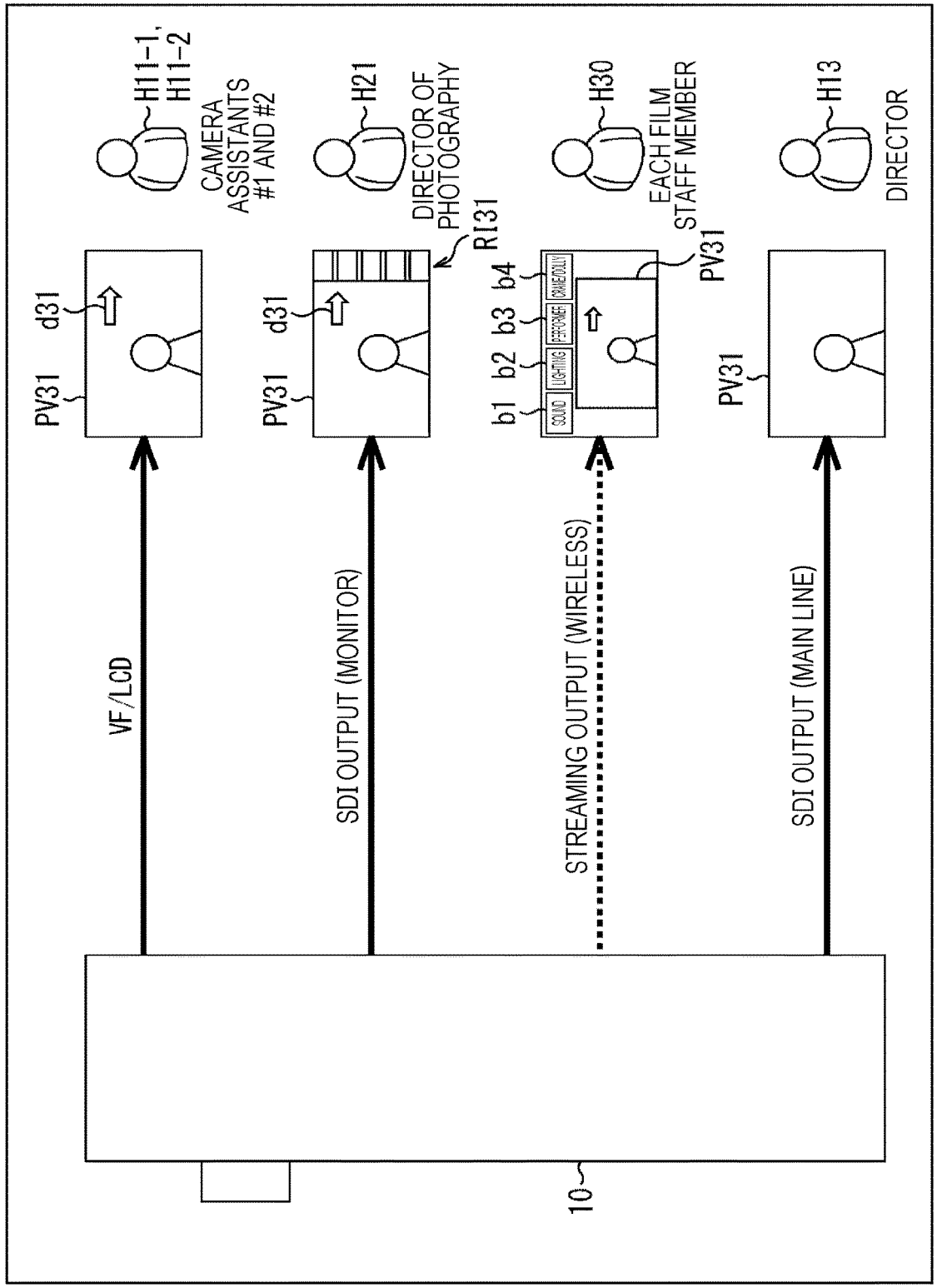
FIG. 10 is a diagram illustrating a use case of the technology according to the present disclosure.

A camera 10B illustrated in FIG. 10 also captures images for production of a movie.

In the example in FIG. 10, in a similar manner to that in FIG. 9, the camera assistants H11-1 and H11-2 are checking the actual performance video PV31 output to a VF or an LCD monitor, and the director H13 is checking the actual performance video PV31 displayed on a main line SDI monitor. Furthermore, in the example in FIG. 10, a director of photography H21 is checking the actual performance video PV31 output to an SDI monitor.

The advance information d31 indicating that the camera is supposed to pan to the right after a predetermined time is superimposed on the actual performance video PV31 being checked by the director of photography H21. This allows the director of photography H21 to make an advance preparation for panning the camera to the right after the predetermined time.

In addition, in the example in FIG. 10, the actual performance video PV31 is wirelessly streamed and output to a monitor of a small display device carried by each of film staff members H30 at the filming location. The actual performance video PV31 is streamed and output to a plurality of the display devices via a hub.

On the monitor of the display device, buttons b1, b2, b3, and b4, one for each role of the film staff members H30, are displayed in addition to the actual performance video PV31. The button b1 is a button for a sound staff member, and the button b2 is a button for a lighting staff member. Furthermore, the button b3 is a button for a performer, and the button b4 is a button for a crane/dolly operator.

Each of the film staff members H30 can select the button for his/her role on the monitor of the display device and check advance information necessary for his/her advance preparation.

Here, a configuration of the display device carried by each of the film staff members H30 will be described with reference to FIG. 11.

Figure 11:
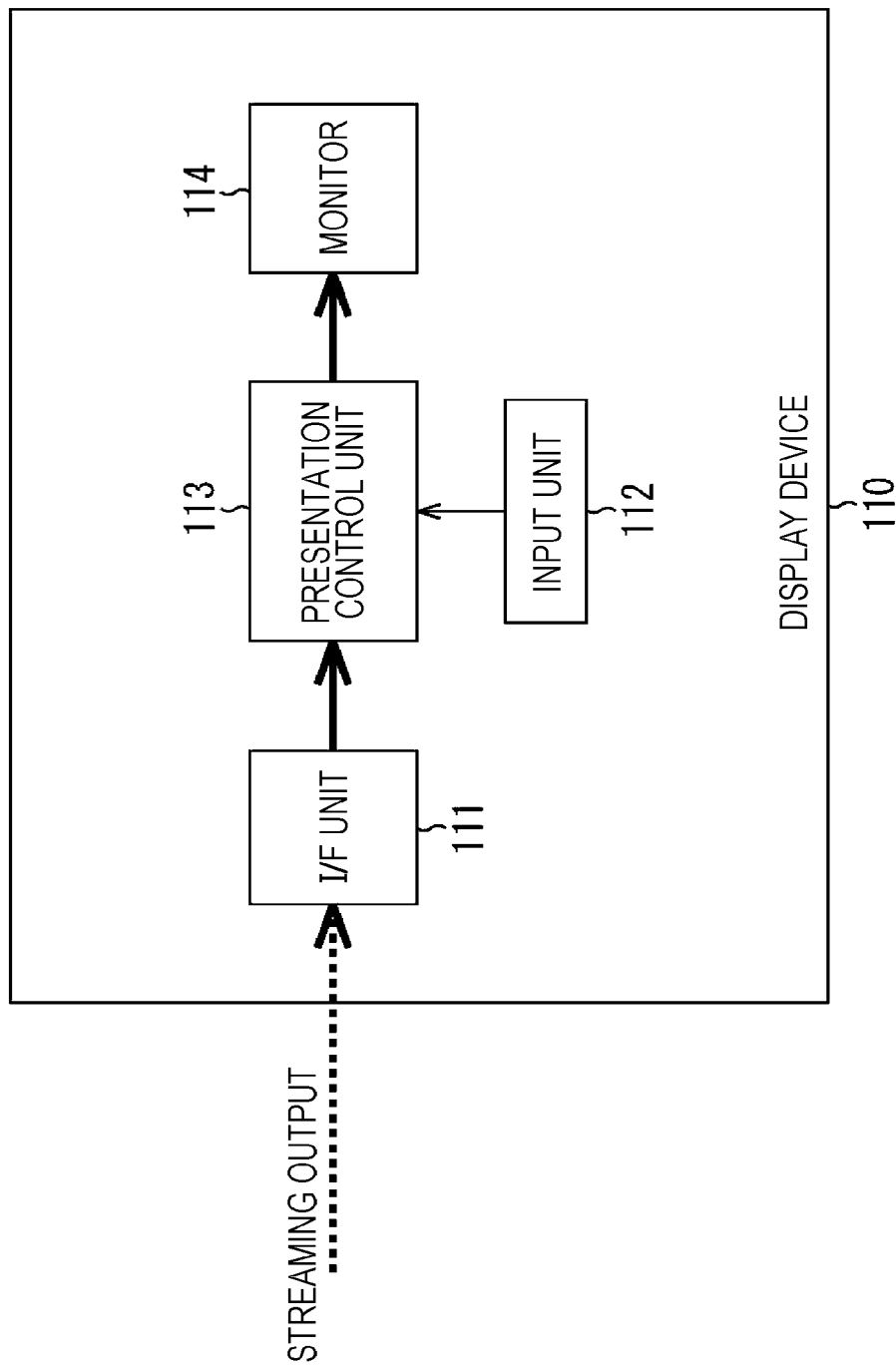
FIG. 11 is a block diagram illustrating a functional configuration example of a display device.

A display device 110 illustrated in FIG. 11 is configured as, for example, a mobile terminal such as a tablet terminal or a smartphone.

The display device 110 includes an I/F unit 111, an input unit 112, a presentation control unit 113, and a monitor 114.

The I/F unit 111 is a wireless interface for communication compatible with a wireless communication standard such as Wi-Fi (registered trademark), 4G, or 5G. The I/F unit 111 receives an actual performance video streamed and output from the camera 10, and supplies the actual performance video to the presentation control unit 113.

Note that the actual performance video on which all pieces of advance information in modes, one for each of the corresponding output systems, are superimposed is streamed and output to the display device 110.

The input unit 112 constitutes a touch panel together with the monitor 114, and accepts a user's operation on the touch panel. For example, the input unit 112 accepts a selection operation of any one of the buttons b1, b2, b3, or b4 displayed on the monitor 114, and supplies an operation signal indicating the content of the operation to the presentation control unit 113.

On the basis of the operation signal from the input unit 112, the presentation control unit 113 controls presentation of the advance information such that the advance information is presented in a mode corresponding to the output destination. Specifically, in accordance with the selection operation by the user selecting the button displayed on the monitor 114, the presentation control unit 113 causes the monitor 114 to display the actual performance video on which the advance information in the mode corresponding to the output system corresponding to the selected button is superimposed.

More specifically, the presentation control unit 113 deletes advance information other than the advance information in the mode corresponding to the output system corresponding to the selected button from the actual performance video on which all pieces of the advance information in the modes, one for each of the corresponding output systems, are superimposed, and then causes the monitor 114 to present the actual performance video.

The monitor 114 constitutes a touch panel together with the input unit 112, and displays, on the basis of the control from the presentation control unit 113, the actual performance video on which the advance information in the mode corresponding to the output system corresponding to the selected button is superimposed.

Figure 12:
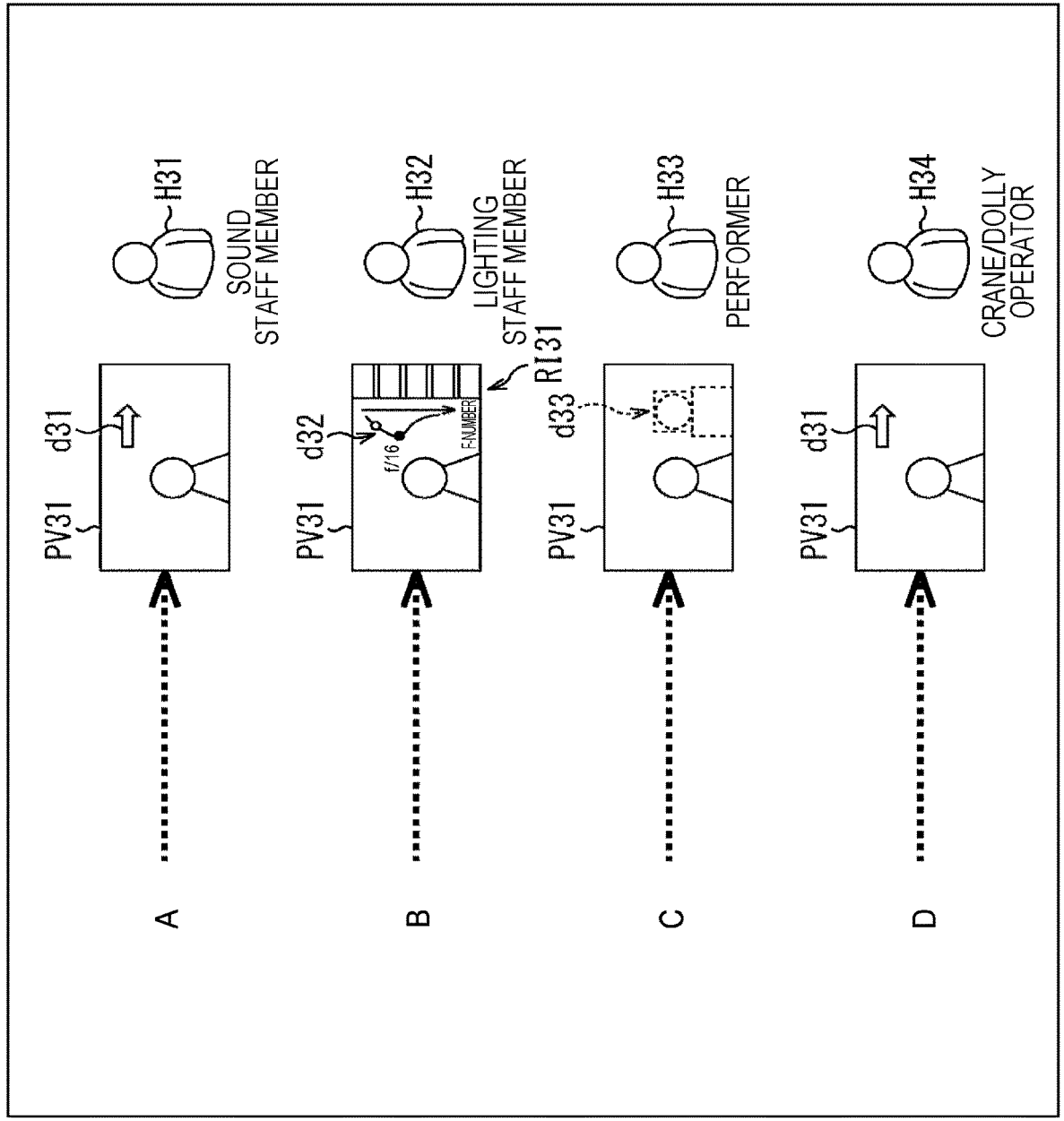
FIG. 12 is a diagram illustrating the advance information displayed on the display device of each film staff member.

FIG. 12 is a diagram illustrating the actual performance video displayed on the display device 110 of each of the film staff members H30.

A of FIG. 12 illustrates the actual performance video PV31 displayed on the display device 110 carried by a sound staff member H31. By selecting the button b1 displayed on the monitor 114 of the display device 110, the sound staff member H31 can check the actual performance video PV31 on which the advance information d31 indicating that the camera is supposed to pan to the right after a predetermined time is superimposed. This allows the sound staff member H31 to make an advance preparation to prevent the external microphone from being captured on the right side of the actual performance video after the predetermined time.

B of FIG. 12 illustrates the actual performance video PV31 displayed on the display device 110 carried by a lighting staff member H32. By selecting the button b2 displayed on the monitor 114 of the display device 110, the lighting staff member H32 can check the actual performance video PV31 on which advance information d32 indicating that the F-number is supposed to become f/16 after a predetermined time is superimposed. This allows the lighting staff member H32 to make an advance preparation for applying light to a face of a subject with a reflector after the predetermined time.

C of FIG. 12 illustrates the actual performance video PV31 displayed on the display device 110 carried by a performer H33. By selecting the button b3 displayed on the monitor 114 of the display device 110, the performer H33 can check the actual performance video PV31 on which advance information d33 indicating the position where the body and face of the performer H33 are supposed to appear after a predetermined time is superimposed. This allows the performer H33 to make an advance preparation for acting at a correct position to stand after the predetermined time.

D of FIG. 12 illustrates the actual performance video PV31 displayed on the display device 110 carried by a crane/dolly operator H34. By selecting the button b4 displayed on the monitor 114 of the display device 110, the crane/dolly operator can check the actual performance video PV31 on which the advance information d31 indicating that the camera is supposed to pan to the right after a predetermined time is superimposed. This allows the crane/dolly operator to make an advance preparation for panning the camera to the right after the predetermined time.

With the above configuration, each of the film staff members H30 can select the button for his/her role on the monitor 114 of the display device 110 to switch the advance information and check the advance information necessary for his/her advance preparation.

Note that, in the above description, the pieces of the advance information for all the output systems are superimposed and then streamed and output from the camera 10. Alternatively, the actual performance video and the pieces of the advance information for all the output systems may be separately streamed and output. In this case, the presentation control unit 113 selects the advance information in the mode corresponding to the output system corresponding to the selected button from the pieces of the advance information for all the output systems, and superimposes the advance information on the actual performance video.

4. Example of Presentation of Advance Information at Filming Location

Figure 13:
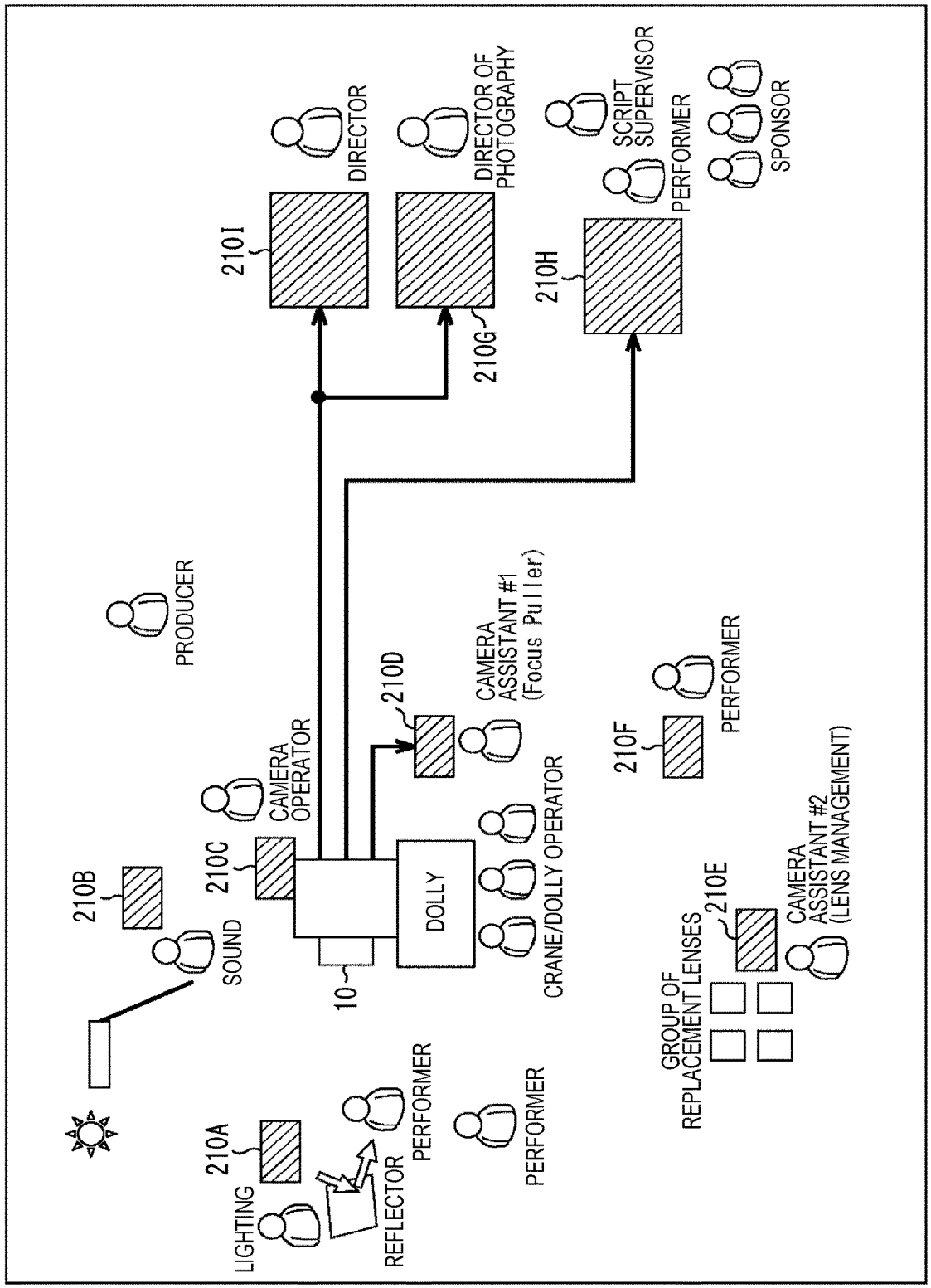
FIG. 13 is a diagram illustrating an example of a filming location.

FIG. 13 is a diagram illustrating an example of a filming location.

As illustrated in FIG. 13, at a filming location where images are captured for production of video content such as a movie, a drama, or a CM, many film staff members are involved in the production.

In the example in FIG. 13, the film staff members at the filming location include, most notably a director, but also a director of photography, a producer, a camera operator, a camera assistant, a sound staff member, a lighting staff member, a crane/dolly operator, and a script supervisor who manages the state and contents of a filming scene. In addition to these film staff members, not only a plurality of performers who are subjects to be imaged, but also personnel from a sponsor of the video content production and the like are at the filming location.

Each of the film staff members and the performers at the filming location can check a video output from the camera 10 to each one of a plurality of monitors.

In the example in FIG. 13, the lighting staff member is checking the video output to a monitor 210A, the sound staff member is checking the video output to a monitor 210B, and the camera operator is checking the video output to a monitor 210C. Furthermore, a camera assistant #1 serving as a focus puller (in charge of focus management) is checking the video output to a monitor 210D, a camera assistant #2 in charge of lens management is checking the video output to a monitor 210E, and a performer waiting to be called is checking the video output to a monitor 210F. Then, the director of photography is checking the video output to a monitor 210G, another performer waiting to be called, the script supervisor, and the personnel from the sponsor are checking the video output to a monitor 210H, and the director is checking the video output to a monitor 210I.

Each person involved at the filming location has a different role, and thus focuses on a different point in a video. Presenting appropriate advance information on the monitor checked by each person involved allows each person involved to make an advance preparation efficiently without fail in an actual filming in which mistakes are not tolerated.

FIG. 14 is a diagram illustrating an example of presentation of the advance information on each of the monitors 210A to 210H at the filming location illustrated in FIG. 13. It is assumed that the same scene in the actual performance video is displayed on each of the monitors 210A to 210H.

The monitor 210A checked by the lighting staff member presents advance information d211 in the shape of a right arrow indicating that the camera is supposed to pan to the right after a certain period of time, and advance information d212 indicating that the F-number is supposed to become f/16. This allows the lighting staff member to make an advance preparation for operating a reflector and lighting equipment.

The monitor 210B checked by the sound staff member presents the advance information d211 in the shape of a right arrow indicating that the camera is supposed to pan to the right after the certain period of time, and advance information d213 indicating the sound level after a certain period of time. The advance information d213 is indicated as a graph representing a change in the sound level with the downward direction in the figure as a time axis direction. A white dot on a curve of the graph represents the current sound level, and a black dot represents the sound level after the certain period of time. This allows the sound staff member to make an advance preparation for appropriately adjusting the sound level while preventing the external microphone from being captured.

The monitor 210C checked by the camera operator presents the advance information d211 in the shape of a right arrow indicating that the camera is supposed to pan to the right after the certain period of time, and advance information d214 in the shape of a rectangular frame indicating that a specific range in the screen is supposed to be zoomed in and displayed. In this case, after the certain period of time, the video in the range surrounded by the advance information d214 is displayed on the entire monitor 210C. This allows the camera operator to make an advance preparation for performing a zoom operation of the camera 10.

The monitor 210D checked by the camera assistant #1 presents the advance information d211 in the shape of a right arrow indicating that the camera is supposed to pan to the right after the certain period of time, and the advance information d214 in the shape of a rectangular frame indicating that a specific range in the screen is supposed to be zoomed in and displayed. This also allows the camera assistant #1 serving as the focus puller to make an advance preparation for performing a zoom operation of the camera 10, in a similar manner to the camera operator.

The monitor 210E checked by the camera assistant #2 presents the advance information d211 in the shape of a right arrow indicating that the camera is supposed to pan to the right after the certain period of time. This allows the camera assistant #2 in charge of lens management to make an advance preparation for replacing the lens of the camera 10 with an appropriate lens.

The monitor 210F checked by the performer waiting to be called presents advance information d215 indicating the position where the performer's body and face are supposed to appear after a certain period of time. This allows the performer waiting to be called to make an advance preparation for acting at the correct position to stand after the certain period of time.

None of the pieces of advance information is presented on the monitor 210G checked by the director of photography. This allows the director of photography to concentrate on checking the entire filming work such as a camerawork, an arrangement of the illumination, and a composition of the video.

The monitor 210H checked by the other performer waiting to be called, the script supervisor, and the personnel from the sponsor displays a screen on which the actual performance video superimposed with the advance information d215 indicating the position where the performer's body and face are supposed to appear after the certain period of time is displayed, and a plurality of representative frame images RI210 representing scenes during the certain period of time. This allows the performer waiting to be called to make an advance preparation for acting at the correct position to stand after the certain period of time, and the script supervisor to check a transition between the scenes during the certain period of time.

The monitor 210I checked by the director displays a screen on which only the actual performance video is displayed, and the plurality of representative frame images RI210 representing the scenes during the certain period of time. Since the director can get an image in his/her head of the position where the performer is supposed to stand, unlike the monitor 210H, the monitor 210I does not present the advance information d215.

Here, with reference to FIG. 15, metadata used for generation of advance information to be presented for each of the above-described film staff members (including performers), and an advance preparation that can be made by each of the film staff members on the basis of the advance information will be exemplified.

In the example in FIG. 14, the monitor checked by the director of photography does not present advance information, but the monitor may present advance information generated on the basis of the F-number, the luminance, and the imaging direction of pan/tilt. In this case, the director of photography can check the timing to change the iris of the lens or the gain, and can check the timing to change the imaging direction of the camera.

The monitor checked by the camera operator presents advance information generated on the basis of GPS information, gyro information, a lens zoom magnification, and an electronic zoom magnification. This allows the camera operator to check the timing to pan/tilt the camera, and check the timing to operate the lens zoom and the electronic zoom.

The monitor checked by the camera assistant #1 in charge of movement of equipment such as a focus puller and a monitor presents advance information generated on the basis of the focus position, the GPS information, the gyro information, the lens zoom magnification, and the electronic zoom magnification. This allows the camera assistant #1 to check the timing to pan/tilt the camera and check the timing to operate the lens zoom and the electronic zoom, and also check the timing to change the position of the camera and check the timing to change the focus.

The monitor checked by the camera assistant #2 in charge of lens replacement, an imaging condition memo, monitor movement, and imaging medium management presents advance information generated on the basis of the GPS information, the gyro information, the lens zoom magnification, and the electronic zoom magnification. This allows the camera assistant #2 to check the timing to pan/tilt the camera, check the timing to operate the lens zoom and the electronic zoom, and also check the timing to change the position of the camera.

The monitor checked by a person in charge of camera equipment who manages camera equipment such as a cable, a battery, and various adapters presents advance information generated on the basis of the GPS information and the gyro information. This allows the person in charge of camera equipment to check the timing to pan/tilt the camera, and check the timing to change the position of the camera.

The monitor checked by the script supervisor presents advance information generated on the basis of the face information. This allows the script supervisor to check connections between cuts in advance.

The monitor checked by the sound staff member presents advance information generated on the basis of sound information and the imaging direction of pan/tilt. This allows the sound staff member to check the timing to prevent an external microphone from being captured in the video.

The monitor checked by the performer presents advance information generated on the basis of the gyro information, the GPS information, the face information, and the zoom magnification. This allows the performer to check the timing at which the performer is supposed to appear in the video or the timing at which the performer is supposed to disappear from the video.

The monitor checked by the crane/dolly operator presents advance information generated on the basis of the gyro information, the GPS information, the face information, and the zoom magnification. This allows the crane/dolly operator to check the timing to move the crane or dolly.

The monitor checked by the lighting staff member presents advance information generated on the basis of the F-number, the luminance, and the color temperature. This allows the lighting staff member to check the timing to operate a reflector or an external illuminating device.

The monitor checked by a prompter presents advance information generated on the basis of voice and face information. This allows the prompter to check the timing to prompt the performer.

The monitor checked by a prop/art staff member presents advance information generated on the basis of the GPS information and the gyro information. This allows the prop/art staff member to check the timing to move a prop or a film set as a subject.

5. Effects

In production of video content such as a movie, a drama, or a CM, a director creates in his/her head an image of a camerawork to be used for filming of the next scene. On the other hand, other film staff members such as a camera assistant, a sound staff member, and a lighting staff member often have difficulty understanding the image only by listening to a verbal instruction from the director, viewing a scenario in a rough sketch or in writing, or viewing a video being captured on a monitor. The present technology allows film staff members other than the director to determine advance preparations to be made for the next scene more easily.

For example, in a case of recording voice by bringing an external microphone different from the microphone built in the camera close to a performer, the sound staff member needs to pay attention to the position of the external microphone and the position where the sound staff member stands so as to prevent the external microphone from being captured in the actual performance video. In such a case, the sound staff member can check in advance, with the use of advance information, whether the camera is supposed to pan or tilt after a certain period of time, and whether the camera is supposed to zoom toward the telephoto end or toward the wide-angle end. This facilitates an advance preparation to prevent the external microphone from being captured in the actual performance video.

Furthermore, the lighting staff member uses a reflector to apply reflected light to the face of the performer, or uses lighting equipment to adjust light to be applied to a subject. Since the way of applying light varies depending on the scene, the lighting staff member can check in advance, with the use of advance information, the camera angle, the position where the performer is supposed to stand, the change in brightness, and the like after a certain period of time. This facilitates an advance preparation for the position of the reflector or operation of the lighting equipment.

A crane and a dolly are large and heavy equipment, and are therefore moved by a plurality of crane/dolly operators in some cases. In such a case, the crane/dolly operators can check in advance, with the use of advance information, the angle of view with which filming is to be performed in a scene after a certain period of time. This facilitates an advance preparation for operation of the crane and the dolly.

Furthermore, the actual performance video is streamed and output wirelessly, and the advance information is presented on a plurality of small display devices carried one by each of the film staff members, so that each film staff member can check only the advance information necessary for the film staff member.

6. Application Example

The technology according to the present disclosure can be applied to a variety of products. For example, the technology according to the present disclosure may be applied to an operating room system.

FIG. 16 is a diagram schematically illustrating an overall configuration of an operating room system 5100 to which the technology according to the present disclosure can be applied. Referring to FIG. 16, the operating room system 5100 has a configuration in which a group of devices installed in the operating room are connected with each other via an audiovisual controller (AV controller) 5107 and an operating room control device 5109, and can cooperate with each other.

A variety of devices may be installed in the operating room. FIG. 16 illustrates, as an example, a group of various devices 5101 for endoscopic surgery, a ceiling camera 5187 that is provided on the ceiling of the operating room and images an area an operator is working on, an operating theater camera 5189 that is provided on the ceiling of the operating room and images a state of the entire operating room, a plurality of display devices 5103A to 5103D, a recorder 5105, a patient bed 5183, and an illuminating device 5191.

Here, among these devices, the group of devices 5101 belongs to an endoscopic surgery system 5113 described later, and includes an endoscope and a display device that displays an image captured by the endoscope. The devices that belong to the endoscopic surgery system 5113 are also referred to as medical-use equipment. On the other hand, the display devices 5103A to 5103D, the recorder 5105, the patient bed 5183, and the illuminating device 5191 are devices provided, separately from the endoscopic surgery system 5113, in the operating room, for example. These devices that do not belong to the endoscopic surgery system 5113 are also referred to as non-medical use equipment. The audiovisual controller 5107 and/or the operating room control device 5109 control operations of the medical equipment and the non-medical equipment in cooperation with each other.

The audiovisual controller 5107 integrally controls processing related to image display in the medical equipment and the non-medical equipment. Specifically, among the devices included in the operating room system 5100, the group of devices 5101, the ceiling camera 5187, and the operating theater camera 5189 can be devices (hereinafter also referred to as transmission source devices) having a function of transmitting information to be displayed during surgery (hereinafter also referred to as display information). Furthermore, the display devices 5103A to 5103D can be devices to which display information is output (hereinafter also referred to as output destination devices). Furthermore, the recorder 5105 can be a device that is both a transmission source device and an output destination device. The audiovisual controller 5107 has a function of controlling operations of a transmission source device and an output destination device, acquiring display information from the transmission source device, transmitting the display information to the output destination device, and displaying or recording the display information. Note that the display information includes various images captured during surgery and various types of information regarding surgery (e.g., physical information of a patient, past examination results, and information regarding a surgical procedure).

Specifically, information regarding an image of a surgical site in a body cavity of a patient imaged by the endoscope can be transmitted as display information from the group of devices 5101 to the audiovisual controller 5107. Furthermore, information regarding an image of the area the operator is working on captured by the ceiling camera 5187 can be transmitted as display information from the ceiling camera 5187. Furthermore, information regarding an image indicating the state of the entire operating room captured by the operating theater camera 5189 can be transmitted as display information from the operating theater camera 5189. Note that, in a case where there is another device having an imaging function in the operating room system 5100, the audiovisual controller 5107 may acquire, also from the other device, information regarding an image captured by the other device as display information.

Alternatively, for example, in the recorder 5105, information regarding these images captured in the past is recorded by the audiovisual controller 5107. The audiovisual controller 5107 can acquire information regarding the images captured in the past from the recorder 5105 as display information. Note that various types of information regarding surgery may also be recorded in the recorder 5105 in advance.

The audiovisual controller 5107 causes at least one of the display devices 5103A to 5103D, which are output destination devices, to display the acquired display information (that is, images captured during surgery and various types of information regarding surgery). In the illustrated example, the display device 5103A is a display device installed and suspended from the ceiling of the operating room, the display device 5103B is a display device installed on a wall surface of the operating room, the display device 5103C is a display device installed on a desk in the operating room, and the display device 5103D is a mobile device (e.g., a tablet personal computer (PC)) having a display function.

Furthermore, although not illustrated in FIG. 16, the operating room system 5100 may include a device outside the operating room. The device outside the operating room can be, for example, a server connected to a network constructed inside and outside a hospital, a PC used by medical staff, or a projector installed in a conference room in the hospital. In a case where there is such an external device outside the hospital, the audiovisual controller 5107 can also cause a display device in another hospital to display the display information via a video conference system or the like for telemedicine.

The operating room control device 5109 integrally controls processing other than processing related to image display in the non-medical equipment. For example, the operating room control device 5109 controls driving of the patient bed 5183, the ceiling camera 5187, the operating theater camera 5189, and the illuminating device 5191.

The operating room system 5100 is provided with a centralized operation panel 5111. Via the centralized operation panel 5111, a user can give an instruction regarding image display to the audiovisual controller 5107, or give an instruction regarding operation of the non-medical equipment to the operating room control device 5109. The centralized operation panel 5111 is constituted by a touch panel provided on a display surface of a display device.

Figure 17:
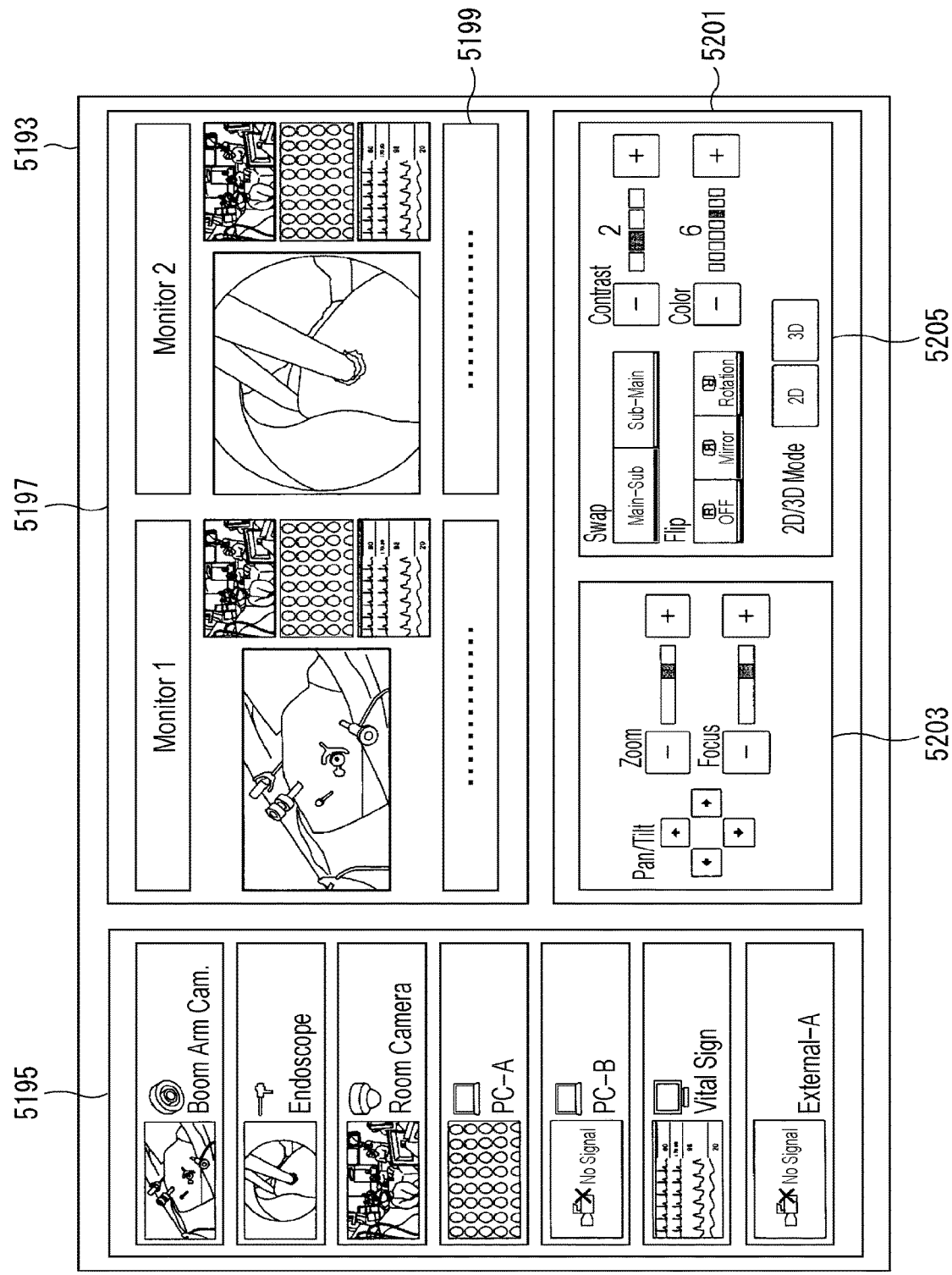
FIG. 17 is a diagram illustrating an example of display of an operation screen on a centralized operation panel.

FIG. 17 is a diagram illustrating an example of display of an operation screen on the centralized operation panel 5111. FIG. 17 illustrates, as an example, an operation screen for a case where two display devices are provided as output destination devices in the operating room system 5100. Referring to FIG. 17, an operation screen 5193 has a transmission source selection area 5195, a preview area 5197, and a control area 5201.

In the transmission source selection area 5195, a transmission source device provided in the operating room system 5100 and a thumbnail screen representing display information in the transmission source device are displayed in association with each other. A user can select display information to be displayed on the display devices from one of the transmission source devices displayed in the transmission source selection area 5195.

In the preview area 5197, previews of screens displayed on the two display devices (Monitor 1 and Monitor 2), which are output destination devices, are displayed. In the illustrated example, four images are displayed in picture-in-picture mode on one display device. The four images correspond to the display information transmitted from the transmission source device selected in the transmission source selection area 5195. One of the four images is displayed relatively large as a main image, and the remaining three images are displayed relatively small as sub-images. The user can switch between the main image and a sub image by appropriately selecting from among areas in which the four images are displayed. Furthermore, a status display area 5199 is provided below the areas in which the four images are displayed, and a status regarding surgery (e.g., elapsed time of surgery and physical information of a patient) can be appropriately displayed in the area.

The control area 5201 is provided with a transmission source operation area 5203 in which graphical user interface (GUI) components for operating the transmission source device are displayed, and an output destination operation area 5205 in which GUI components for operating the output destination devices are displayed. In the illustrated example, the transmission source operation area 5203 is provided with GUI components for performing various operations (pan, tilt, and zoom) on a camera in the transmission source device having an imaging function. The user can operate the camera in the transmission source device by appropriately selecting from among these GUI components. Note that, although not illustrated, in a case where the transmission source device selected in the transmission source selection area 5195 is a recorder (that is, in a case where an image that has been recorded in the recorder in the past is displayed in the preview area 5197), the transmission source operation area 5203 may be provided with GUI components for performing operations such as play, stop, rewind, and fast forward of the image.

Furthermore, the output destination operation area 5205 is provided with GUI components for performing various operations (swap, flip, color adjustment, contrast adjustment, and switching between 2D display and 3D display) on display on the display devices, which are the output destination devices. The user can operate the display on the display device by appropriately selecting from among these GUI components.

Note that the operation screen displayed on the centralized operation panel 5111 is not limited to the illustrated example. A user may be able to perform, via the centralized operation panel 5111, an operation input for each of the devices that are provided in the operating room system 5100 and can be controlled by the audiovisual controller 5107 and the operating room control device 5109.

Figure 18:
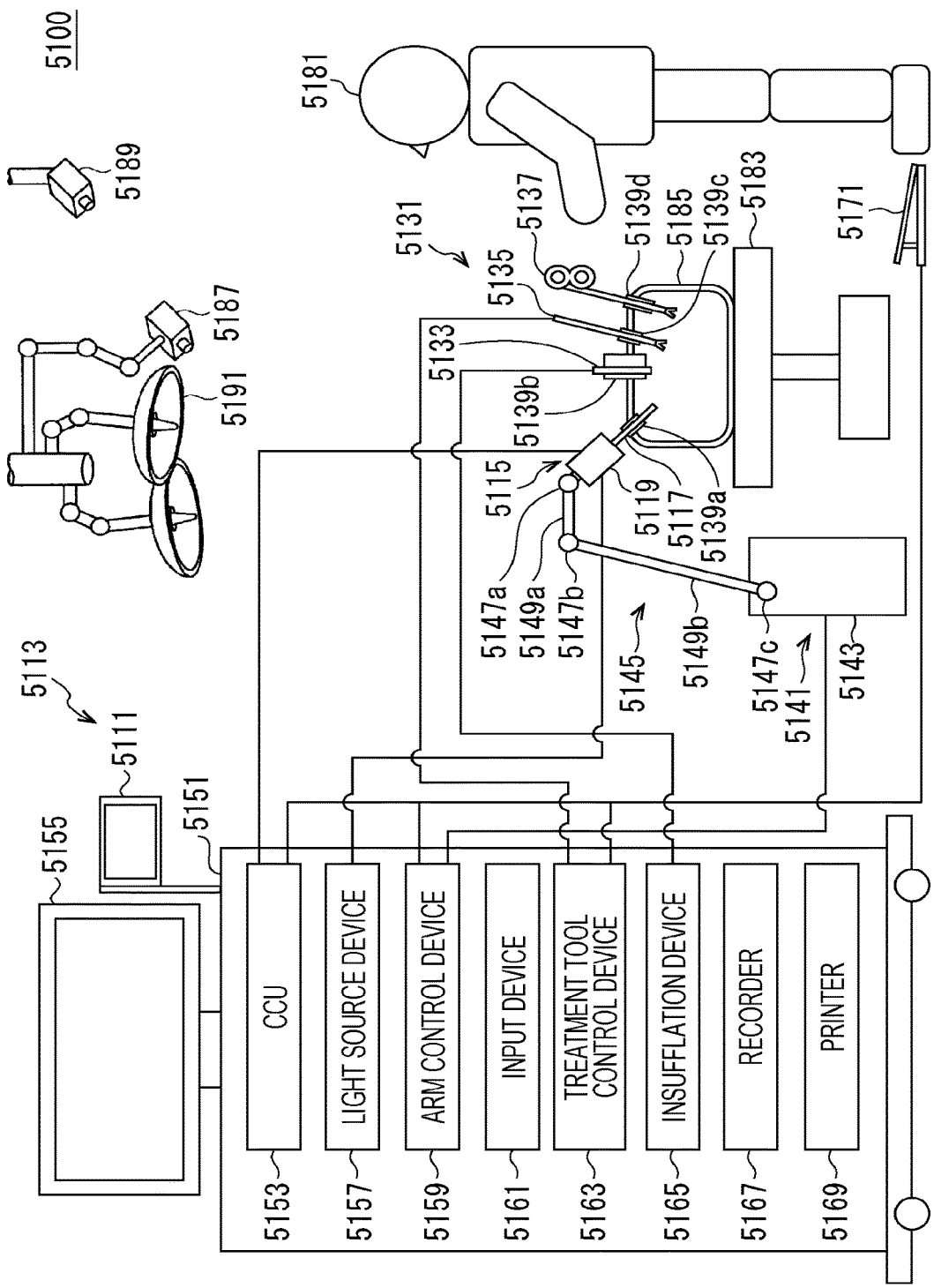
FIG. 18 is a diagram illustrating an example of a state of surgery for which the operating room system is used.

FIG. 18 is a diagram illustrating an example of a state of surgery for which the operating room system described above is used. The ceiling camera 5187 and the operating theater camera 5189 are provided on the ceiling of the operating room, and can image an area an operator (surgeon) 5181, who performs treatment on an affected part of a patient 5185 on the patient bed 5183, is working on, and the state of the entire operating room. The ceiling camera 5187 and the operating theater camera 5189 may have a magnification adjustment function, a focal length adjustment function, an imaging direction adjustment function, and the like. The illuminating device 5191 is provided on the ceiling of the operating room, and illuminates at least the area the operator 5181 is working on. The illuminating device 5191 may be appropriately adjustable in amount of emitted light, wavelength (color) of the emitted light, direction of emission of the light, and the like.

As illustrated in FIG. 16, the endoscopic surgery system 5113, the patient bed 5183, the ceiling camera 5187, the operating theater camera 5189, and the illuminating device 5191 are connected with each other via the audiovisual controller 5107 and the operating room control device 5109 (not illustrated in FIG. 18), and can cooperate with each other. The centralized operation panel 5111 is provided in the operating room, and as described above, a user can appropriately operate these devices in the operating room via the centralized operation panel 5111.

Hereinafter, a configuration of the endoscopic surgery system 5113 will be described in detail. As illustrated, the endoscopic surgery system 5113 includes an endoscope 5115, other surgical tools 5131, a support arm device 5141 that supports the endoscope 5115, and a cart 5151 on which various devices for endoscopic surgery are mounted.

In endoscopic surgery, an abdominal wall is not cut and opened, but is pierced with a plurality of tubular hole-opening instruments called trocars 5139a to 5139d. Then, a lens barrel 5117 of the endoscope 5115 and the other surgical tools 5131 are inserted into a body cavity of the patient 5185 through the trocars 5139a to 5139d. In the illustrated example, an insufflation tube 5133, an energy treatment tool 5135, and forceps 5137 are inserted into the body cavity of the patient 5185 as the other surgical tools 5131. Furthermore, the energy treatment tool 5135 is used to perform incision and exfoliation of tissue, sealing of a blood vessel, or the like by using a high-frequency current or ultrasonic vibration. However, the illustrated surgical tools 5131 are merely an example, and various surgical tools generally used in endoscopic surgery, such as tweezers and a retractor, may be used as the surgical tools 5131.

An image of a surgical site in the body cavity of the patient 5185 captured by the endoscope 5115 is displayed on a display device 5155. The operator 5181 performs treatment such as excision of an affected part, for example, using the energy treatment tool 5135 or the forceps 5137 while viewing the image of the surgical site displayed on the display device 5155 in real time. Note that, although not illustrated, the insufflation tube 5133, the energy treatment tool 5135, and the forceps 5137 are supported by the operator 5181, an assistant, or the like during surgery.

(Support Arm Device)

The support arm device 5141 includes an arm 5145 extending from a base portion 5143. In the illustrated example, the arm 5145 includes joints 5147a, 5147b, and 5147c, and links 5149a and 5149b, and is driven by control of an arm control device 5159. The arm 5145 supports the endoscope 5115 so as to control its position and posture. With this arrangement, the position of the endoscope 5115 can be stably fixed.

(Endoscope)

The endoscope 5115 includes the lens barrel 5117 whose predetermined length from its distal end is inserted into the body cavity of the patient 5185, and a camera head 5119 connected to a proximal end of the lens barrel 5117. In the illustrated example, the endoscope 5115 configured as a so-called rigid endoscope having the lens barrel 5117 that is rigid is illustrated. Alternatively, the endoscope 5115 may be configured as a so-called flexible endoscope having the lens barrel 5117 that is flexible.

The lens barrel 5117 is provided with, at the distal end thereof, an opening portion in which an objective lens is fitted. The endoscope 5115 is connected with a light source device 5157. Light generated by the light source device 5157 is guided to the distal end of the lens barrel by a light guide extending inside the lens barrel 5117, and is emitted through the objective lens toward an observation target in the body cavity of the patient 5185. Note that the endoscope 5115 may be a forward-viewing endoscope, an oblique-viewing endoscope, or a side-viewing endoscope.

The camera head 5119 is provided with an optical system and an imaging element inside thereof, and light reflected from the observation target (observation light) is collected on the imaging element by the optical system. The imaging element photoelectrically converts the observation light to generate an electric signal corresponding to the observation light, that is, an image signal corresponding to an observation image. The image signal is transmitted to a camera control unit (CCU) 5153 as raw data. Note that the camera head 5119 has a function of adjusting a magnification and a focal length by appropriately driving the optical system.

Note that the camera head 5119 may be provided with a plurality of imaging elements in order to support, for example, stereoscopic viewing (3D display). In this case, the lens barrel 5117 is provided with a plurality of relay optical systems inside thereof to guide observation light to each one of the plurality of imaging elements.

(Various Devices Mounted on Cart)

The CCU 5153 is constituted by a central processing unit (CPU), a graphics processing unit (GPU), and the like, and integrally controls operations of the endoscope 5115 and the display device 5155. Specifically, the CCU 5153 performs, on an image signal received from the camera head 5119, various types of image processing for displaying an image based on the image signal, such as development processing (demosaic processing), for example. The CCU 5153 provides the display device 5155 with the image signal that has been subjected to the image processing. Furthermore, the audiovisual controller 5107 illustrated in FIG. 16 is connected to the CCU 5153. The CCU 5153 also provides the audiovisual controller 5107 with the image signal that has been subjected to the image processing to. Furthermore, the CCU 5153 transmits a control signal to the camera head 5119 to control its driving. The control signal may contain information regarding imaging conditions such as the magnification and the focal length. The information regarding the imaging conditions may be input via an input device 5161 or may be input via the centralized operation panel 5111 described above.

The CCU 5153 controls the display device 5155 to display an image based on the image signal on which the CCU 5153 has performed image processing. In a case where, for example, the endoscope 5115 supports imaging with a high resolution such as 4K (3840 horizontal pixels× 2160 vertical pixels) or 8K (7680 horizontal pixels×4320 vertical pixels), and/or in a case where the endoscope 5115 supports 3D display, a display device supporting high-resolution display and/or 3D display can be used accordingly as the display device 5155. In a case where imaging with a high resolution such as 4K or 8K is supported, a display device having a size of 55 inches or more can be used as the display device 5155 to provide more immersive feeling. Furthermore, a plurality of the display devices 5155 having different resolutions and sizes may be provided in accordance with the intended use.

The light source device 5157 includes a light source such as a light emitting diode (LED), for example, and supplies the endoscope 5115 with emitted light at the time of imaging a surgical site.

The arm control device 5159 is constituted by a processor such as a CPU, and operates in accordance with a predetermined program to control driving of the arm 5145 of the support arm device 5141 in accordance with a predetermined control method.

The input device 5161 is an input interface to the endoscopic surgery system 5113. A user can input various types of information and input instructions to the endoscopic surgery system 5113 via the input device 5161. For example, the user may input, via the input device 5161, various types of information regarding surgery, such as physical information of a patient and information regarding a surgical procedure. Furthermore, for example, the user may input, via the input device 5161, an instruction to drive the arm 5145, an instruction to change imaging conditions (the type of emitted light, the magnification and focal length, and the like) of the endoscope 5115, an instruction to drive the energy treatment tool 5135, and the like.

The type of the input device 5161 is not limited, and various known input devices may be used as the input device 5161. As the input device 5161, for example, a mouse, a keyboard, a touch panel, a switch, a foot switch 5171, and/or a lever can be used. In a case where a touch panel is used as the input device 5161, the touch panel may be provided on a display surface of the display device 5155.

Alternatively, the input device 5161 is a device worn by a user, such as a glasses-type wearable device or a head mounted display (HMD), for example, and various inputs are performed in accordance with a user's gesture or line-of-sight detected by these devices. Furthermore, the input device 5161 includes a camera capable of detecting a movement of a user, and various inputs are performed in accordance with a user's gesture or line-of-sight detected from a video captured by the camera. Moreover, the input device 5161 includes a microphone capable of collecting a user's voice, and various inputs are performed by voice via the microphone. As described above, the input device 5161 has a configuration in which various types of information can be input in a non-contact manner, and this allows, in particular, a user belonging to a clean area (e.g., the operator 5181) to operate equipment belonging to an unclean area in a non-contact manner. Furthermore, the user can operate the equipment while holding a surgical tool in hand, and this improves convenience of the user.

A treatment tool control device 5163 controls driving of the energy treatment tool 5135 for cauterization or incision of tissue, sealing of a blood vessel, or the like. An insufflation device 5165 sends gas through the insufflation tube 5133 into the body cavity in order to inflate the body cavity of the patient 5185 for the purpose of securing a field of view of the endoscope 5115 and securing a working space for the operator. A recorder 5167 is a device that can record various types of information regarding surgery. A printer 5169 is a device that can print various types of information regarding surgery in various formats such as text, images, or graphs.

A particularly characteristic configuration of the endoscopic surgery system 5113 will be described below in more detail.

(Support Arm Device)

The support arm device 5141 includes the base portion 5143 as a base, and the arm 5145 extending from the base portion 5143. In the illustrated example, the arm 5145 includes the plurality of joints 5147a, 5147b, and 5147c, and the plurality of links 5149a and 5149b coupled by the joint 5147b. However, FIG. 18 illustrates a configuration of the arm 5145 in a simplified manner for ease. In practice, the shapes, the numbers, and the arrangement of the joints 5147a to 5147c and the links 5149a and 5149b, the directions of rotation axes of the joints 5147a to 5147c, and the like can be appropriately set so that the arm 5145 has a desired degree of freedom. For example, the arm 5145 may suitably have a configuration that enables six or more degrees of freedom. With this arrangement, the endoscope 5115 can be freely moved within a movable range of the arm 5145, and the lens barrel 5117 of the endoscope 5115 can be inserted into the body cavity of the patient 5185 from a desired direction.

The joints 5147a to 5147c are provided with actuators, and the joints 5147a to 5147c have a configuration that enables rotation about a predetermined rotation axis by driving of the actuators. The arm control device 5159 controls the driving of the actuators, thereby controlling a rotation angle of each of the joints 5147a to 5147c, and controlling the driving of the arm 5145. With this arrangement, the position and posture of the endoscope 5115 can be controlled. At this time, the arm control device 5159 can control the driving of the arm 5145 by various known control methods such as force control or position control.

For example, the position and posture of the endoscope 5115 may be controlled by the operator 5181 performing an appropriate operation input via the input device 5161 (including the foot switch 5171), thereby causing the arm control device 5159 to appropriately control the driving of the arm 5145 in accordance with the operation input. With this control, the endoscope 5115 at a distal end of the arm 5145 can be moved from an optional position to an optional position, and then fixedly supported at the position after the movement. Note that the arm 5145 may be operated by a so-called master-slave method. In this case, the arm 5145 can be remotely controlled by a user via the input device 5161 installed at a location away from an operating room.

Furthermore, in a case where the force control is applied, so-called power assist control may be performed in which the arm control device 5159 receives an external force from a user and drives the actuators of the corresponding joints 5147a to 5147c so that the arm 5145 moves smoothly in accordance with the external force. With this arrangement, when the user moves the arm 5145 while directly touching the arm 5145, the arm 5145 can be moved with a relatively light force. Thus, the endoscope 5115 can be moved more intuitively and with a simpler operation, and this improves convenience of the user.

Here, in general, the endoscope 5115 has been supported by a doctor called an endoscopist during endoscopic surgery. On the other hand, by using the support arm device 5141, the position of the endoscope 5115 can be fixed more securely without manual operation. This makes it possible to stably obtain an image of a surgical site and smoothly perform surgery.

Note that the arm control device 5159 is not necessarily provided at the cart 5151. Furthermore, the arm control device 5159 is not necessarily one device. For example, the arm control devices 5159 may be provided one for each of the joints 5147a to 5147c of the arm 5145 of the support arm device 5141, and a plurality of the arm control devices 5159 may cooperate with one another to control the driving of the arm 5145.

(Light Source Device)

The light source device 5157 supplies the endoscope 5115 with emitted light at the time of imaging a surgical site. The light source device 5157 is constituted by a white light source including, for example, an LED, a laser light source, or a combination thereof. At this time, in a case where the white light source is constituted by a combination of RGB laser light sources, an output intensity and output timing of each color (each wavelength) can be controlled with high precision, and this enables white balance adjustment of a captured image at the light source device 5157. Furthermore, in this case, an image for each of R, G, and B can be captured in a time-division manner by emitting laser light from each of the RGB laser light sources to an observation target in a time-division manner, and controlling driving of the imaging element of the camera head 5119 in synchronization with the emission timing. According to this method, a color image can be obtained without providing a color filter in the imaging element.

Furthermore, driving of the light source device 5157 may be controlled so that the intensity of light to be output changes at a predetermined time interval. By controlling the driving of the imaging element of the camera head 5119 in synchronization with the timing of the change in the light intensity, acquiring images in a time-division manner, and generating a composite image from the images, a high dynamic range image without so-called blocked up shadows or blown out highlights can be generated.

Furthermore, the light source device 5157 may have a configuration in which light can be supplied in a predetermined wavelength band that can be used for special light observation. In special light observation, for example, by utilizing wavelength dependence of light absorption in body tissue, so-called narrow band imaging is performed in which a predetermined tissue such as a blood vessel in a mucosal surface layer is imaged with high contrast by emitting light in a band narrower than that of light emitted during normal observation (that is, white light). Alternatively, in special light observation, fluorescence observation may be performed in which an image is obtained by fluorescence generated by emitting excitation light. In fluorescence observation, for example, excitation light is emitted to body tissue and fluorescence from the body tissue is observed (autofluorescence observation), or a fluorescent image is obtained by locally injecting a reagent such as indocyanine green (ICG) into body tissue and emitting excitation light corresponding to a fluorescence wavelength of the reagent to the body tissue. The light source device 5157 may have a configuration in which narrow-band light and/or excitation light that can be used for such special light observation can be supplied.

(Camera Head and CCU)

Figure 19:
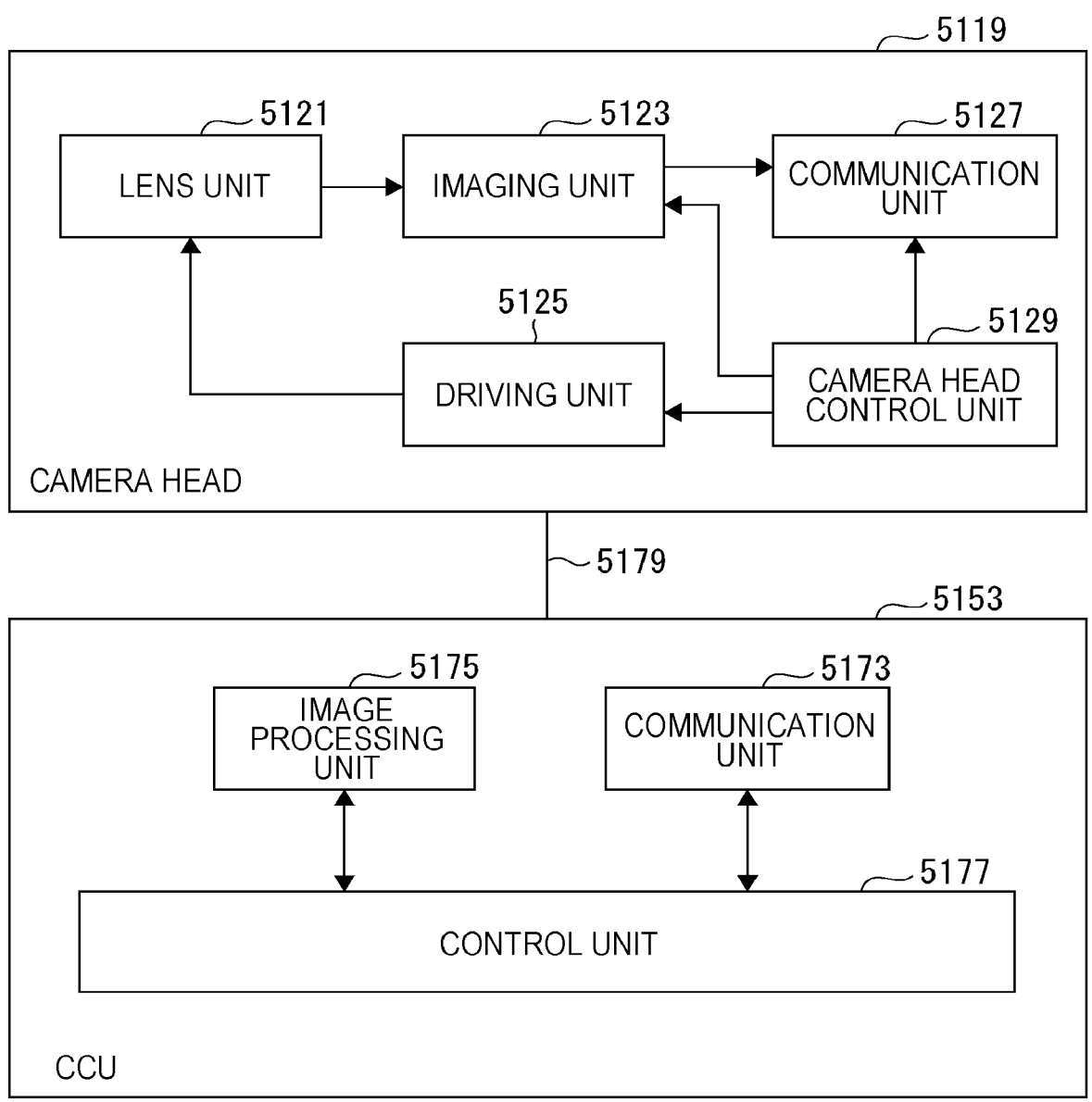
FIG. 19 is a block diagram illustrating an example of a functional configuration of a camera head and a CCU illustrated in FIG. 18.

Functions of the camera head 5119 of the endoscope 5115 and the CCU 5153 will be described in more detail with reference to FIG. 19. FIG. 19 is a block diagram illustrating an example of a functional configuration of the camera head 5119 and the CCU 5153 illustrated in FIG. 18.

Referring to FIG. 19, the camera head 5119 has functions including a lens unit 5121, an imaging unit 5123, a driving unit 5125, a communication unit 5127, and a camera head control unit 5129. Furthermore, the CCU 5153 has functions including a communication unit 5173, an image processing unit 5175, and a control unit 5177. The camera head 5119 and the CCU 5153 are connected by a transmission cable 5179 to allow two-way communication.

First, the functional configuration of the camera head 5119 will be described. The lens unit 5121 is an optical system provided at a connection with the lens barrel 5117. Observation light taken in from the distal end of the lens barrel 5117 is guided to the camera head 5119 and enters the lens unit 5121. The lens unit 5121 is constituted by a combination of a plurality of lenses including a zoom lens and a focus lens. Optical characteristics of the lens unit 5121 are adjusted so that observation light may be collected on a light receiving surface of an imaging element of the imaging unit 5123. Furthermore, the zoom lens and the focus lens have a configuration in which their positions can be moved on an optical axis for adjustment of a magnification and a focus of a captured image.

The imaging unit 5123 includes the imaging element, and is arranged at a stage subsequent to the lens unit 5121. Observation light that has passed through the lens unit 5121 is collected on the light receiving surface of the imaging element, and an image signal corresponding to an observation image is generated by photoelectric conversion. The image signal generated by the imaging unit 5123 is provided to the communication unit 5127.

As the imaging element included in the imaging unit 5123, for example, a complementary metal oxide semiconductor (CMOS) type image sensor that has a Bayer array and can capture a color image is used. Note that, as the imaging element, an imaging element capable of capturing a high-resolution image of, for example, 4K or more may be used. An image of a surgical site can be obtained with a high resolution, and this allows the operator 5181 to grasp the state of the surgical site in more detail, and proceed with surgery more smoothly.

Furthermore, the imaging element included in the imaging unit 5123 has a configuration including a pair of imaging elements, one for acquiring a right-eye image signal and the other for acquiring a left-eye image signal supporting 3D display. The 3D display allows the operator 5181 to grasp the depth of living tissue in the surgical site more accurately. Note that, in a case where the imaging unit 5123 has a multi-plate type configuration, a plurality of the lens units 5121 is provided for the corresponding imaging elements.

Furthermore, the imaging unit 5123 is not necessarily provided in the camera head 5119. For example, the imaging unit 5123 may be provided inside the lens barrel 5117 just behind the objective lens.

The driving unit 5125 is constituted by an actuator, and the camera head control unit 5129 controls the zoom lens and the focus lens of the lens unit 5121 to move by a predetermined distance along the optical axis. With this arrangement, the magnification and the focus of an image captured by the imaging unit 5123 can be appropriately adjusted.

The communication unit 5127 is constituted by a communication device for transmitting and receiving various types of information to and from the CCU 5153. The communication unit 5127 transmits an image signal obtained from the imaging unit 5123 as raw data to the CCU 5153 via the transmission cable 5179. At this time, it is preferable that the image signal be transmitted by optical communication in order to display a captured image of a surgical site with a low latency. This is because, during surgery, the operator 5181 performs surgery while observing a state of an affected part from a captured image, and it is required that a moving image of the surgical site be displayed in real time as much as possible for safer and more reliable surgery. In a case where optical communication is performed, the communication unit 5127 is provided with a photoelectric conversion module that converts an electric signal into an optical signal. An image signal is converted into an optical signal by the photoelectric conversion module, and then transmitted to the CCU 5153 via the transmission cable 5179.

Furthermore, the communication unit 5127 receives a control signal for controlling driving of the camera head 5119 from the CCU 5153. The control signal contains information regarding imaging conditions such as information for specifying a frame rate of a captured image, information for specifying an exposure value at the time of imaging, and/or information for specifying a magnification and focus of the captured image. The communication unit 5127 provides the received control signal to the camera head control unit 5129. Note that the control signal from the CCU 5153 may also be transmitted by optical communication. In this case, the communication unit 5127 is provided with a photoelectric conversion module that converts an optical signal into an electric signal. The control signal is converted into an electric signal by the photoelectric conversion module, and then provided to the camera head control unit 5129.

Note that the imaging conditions such as the frame rate, the exposure value, the magnification, and the focus described above are automatically set by the control unit 5177 of the CCU 5153 on the basis of an acquired image signal. That is, the endoscope 5115 has a so-called auto exposure (AE) function, an auto focus (AF) function, and an auto white balance (AWB) function.

The camera head control unit 5129 controls the driving of the camera head 5119 on the basis of the control signal from the CCU 5153 received via the communication unit 5127. For example, the camera head control unit 5129 controls driving of the imaging element of the imaging unit 5123 on the basis of information for specifying a frame rate of a captured image and/or information for specifying exposure at the time of imaging. Furthermore, for example, the camera head control unit 5129 appropriately moves the zoom lens and the focus lens of the lens unit 5121 via the driving unit 5125 on the basis of information for specifying a magnification and a focus of a captured image. The camera head control unit 5129 may further include a function of storing information for recognizing the lens barrel 5117 and the camera head 5119.

Note that, by arranging the configurations of the lens unit 5121, the imaging unit 5123, and the like in a hermetically sealed structure having high airtightness and waterproofness, the camera head 5119 can have resistance to autoclave sterilization.

Next, the functional configuration of the CCU 5153 will be described. The communication unit 5173 is constituted by a communication device for transmitting and receiving various types of information to and from the camera head 5119. The communication unit 5173 receives an image signal transmitted from the camera head 5119 via the transmission cable 5179. At this time, as described above, the image signal can be suitably transmitted by optical communication. In this case, to support optical communication, the communication unit 5173 is provided with a photoelectric conversion module that converts an optical signal into an electric signal. The communication unit 5173 provides the image processing unit 5175 with the image signal converted into an electric signal.

Furthermore, the communication unit 5173 transmits a control signal for controlling the driving of the camera head 5119 to the camera head 5119. The control signal may also be transmitted by optical communication.

The image processing unit 5175 performs various types of image processing on an image signal that is raw data transmitted from the camera head 5119. Examples of the image processing include various types of known signal processing such as development processing, high image quality processing (such as band emphasis processing, super-resolution processing, noise reduction (NR) processing, and/or camera shake correction processing), and/or enlargement processing (electronic zoom processing). Furthermore, the image processing unit 5175 performs demodulation processing on the image signal for performing AE, AF, and AWB.

The image processing unit 5175 is constituted by a processor such as a CPU or a GPU, and the image processing and demodulation processing described above can be performed by the processor operating in accordance with a predetermined program. Note that, in a case where the image processing unit 5175 is constituted by a plurality of GPUs, the image processing unit 5175 appropriately divides information related to the image signal, and image processing is performed in parallel by the plurality of GPUs.

The control unit 5177 performs various controls regarding capturing of an image of a surgical site by the endoscope 5115 and display of the captured image. For example, the control unit 5177 generates a control signal for controlling the driving of the camera head 5119. At this time, in a case where imaging conditions have been input by a user, the control unit 5177 generates a control signal on the basis of the input by the user. Alternatively, in a case where the endoscope 5115 has an AE function, an AF function, and an AWB function, the control unit 5177 appropriately calculates an optimal exposure value, focal length, and white balance in accordance with a result of demodulation processing performed by the image processing unit 5175, and generates a control signal.

Furthermore, the control unit 5177 causes the display device 5155 to display an image of a surgical site on the basis of an image signal on which the image processing unit 5175 has performed image processing. At this time, the control unit 5177 uses various image recognition technologies to recognize various objects in the image of the surgical site. For example, the control unit 5177 can recognize a surgical tool such as forceps, a specific living body site, bleeding, mist at the time of using the energy treatment tool 5135, and the like by detecting a shape, color, and the like of an edge of an object in the image of the surgical site. When the image of the surgical site is displayed on the display device 5155, the control unit 5177 superimposes various types of surgery support information upon the image of the surgical site using results of the recognition. The surgery support information is superimposed and presented to the operator 5181, and this allows surgery to be performed more safely and reliably.

The transmission cable 5179 connecting the camera head 5119 and the CCU 5153 is an electric signal cable that supports electric signal communication, an optical fiber cable that supports optical communication, or a composite cable thereof.

Here, in the illustrated example, wired communication is performed using the transmission cable 5179, but wireless communication may be performed between the camera head 5119 and the CCU 5153. In a case where wireless communication is performed between the two, the transmission cable 5179 does not need to be laid in the operating room. This may resolve a situation in which movement of medical staff in the operating room is hindered by the transmission cable 5179.

The example of the operating room system 5100 to which the technology according to the present disclosure can be applied has been described above. Note that, here, a case where a medical system for which the operating room system 5100 is used is the endoscopic surgery system 5113 has been described as an example, but the configuration of the operating room system 5100 is not limited to such an example. For example, the operating room system 5100 may be used for a flexible endoscope system for examination or a microscopic surgery system instead of the endoscopic surgery system 5113.

The present technology can be applied to the display devices 5103A to 5103D installed at corresponding places in the operating room among the above-described components. By applying the present technology to the display devices 5103A to 5103D, advance information for making a variety of advance preparations is presented in a mode corresponding to an operator who checks a surgical site image (each of the display devices 5103A to 5103D).

For example, with a specific scene in a surgical site image as a trigger, advance information for an anesthesiologist to make an advance preparation is presented on a mobile terminal such as a smartphone carried by the anesthesiologist or a monitor of a display device for the anesthesiologist.

The above-described example can be applied to a case where the anesthesiologist is present throughout the surgery, a case where the anesthesiologist takes part in a plurality of surgeries, and the like. The monitor checked by the anesthesiologist presents, as advance information, information regarding a surgical scene and a remaining time of the surgery. Furthermore, as advance information, a notification of a timing at which determination by the anesthesiologist is necessary may be given on the basis of values of vital signs displayed on an anesthesia machine, a breathing device, a patient monitor, or the like.

Furthermore, with a specific scene in a surgical site image as a trigger, advance information for a nurse to perform treatment after a certain period of time has passed may be presented on a monitor checked by the nurse.

The above-described example can be applied to, for example, a case where hepatectomy is performed in liver cancer surgery. The monitor checked by the nurse presents, as advance information, a timing to block/unblock blood flow to the liver, for example, block blood flow for 15 minutes and unblock blood flow for 5 minutes. Conventionally, a nurse has managed time during surgery by measuring time with a timer or the like. According to the present technology, it is possible to accurately manage time without error in time measurement.

Moreover, with a specific scene in a surgical site image as a trigger, a type of a surgical instrument that needs to be replaced and the timing to replace the surgical instrument may be presented as advance information on the monitor checked by the nurse. For example, with a specific scene in a surgical site image as a trigger, advance information regarding a suture needle and a suture thread that need to be prepared is presented on a monitor checked by a scrub nurse. Since the suture needle needs to be threaded with the suture thread in advance as a preparation, the scrub nurse can smoothly make the preparation with such advance information.

In a similar manner, with a specific scene in a surgical site image as a trigger, advance information regarding surgical instruments and hygienic materials that need to be prepared, such as forceps, an electric scalpel, a drain, and gauze, can be presented on the monitor checked by the scrub nurse.

Furthermore, with a specific scene in a surgical site image as a trigger, advance information for operating a camera in association with a step in a surgical procedure may be presented on a monitor checked by an operator who operates the camera.

The above-described example can be applied to, for example, a case where a surgical site is zoomed in and imaged when tissue around the surgical site is grasped with forceps and the surgical site is excised or exfoliated while the entire surgical site is imaged in a bird's eye view. For example, with a specific scene in a surgical site image as a trigger, advance information regarding preparation of forceps, an electric scalpel, a drain, and the like and adjustment of an intraperitoneal pressure is presented in accordance with the surgical procedure on a monitor checked by an assistant. Advance information for giving an instruction to pan, tilt, or zoom an endoscope may be presented on a monitor checked by an endoscopist.

Embodiments of the technology according to the present disclosure are not limited to the embodiment described above but can be modified in various ways within a scope of the present technology according to the present disclosure.

Furthermore, the effects described herein are merely illustrative and are not intended to be restrictive, and other effects may be obtained.

Moreover, the technology according to the present disclosure may have the following configurations.

(1)
A video processing apparatus including:
a presentation control unit that controls, in such a way that, with a first scene of a captured video currently being captured used as a reference, advance information regarding a second scene is presented at a presentation timing before the second scene after the first scene, in a mode corresponding to an output destination of the captured video, the presentation of the advance information.

(2)
The video processing apparatus according to (1), in which the presentation control unit controls superimposition of the advance information on the captured video.

(3)
The video processing apparatus according to (1) or (2), in which
the advance information is information that prompts a user corresponding to the output destination to perform an operation for the second scene.

(4)
The video processing apparatus according to (3), in which the advance information is information for presenting, to the user, a change in metadata of the captured video in the second scene.

(5)
The video processing apparatus according to (4), in which the advance information is display information that includes at least one of a character, a symbol, or a figure.

(6)
The video processing apparatus according to any one of (1) to (5), in which
the presentation timing of the advance information is set to a different timing for each of the output destinations.

(7)
The video processing apparatus according to any one of (1) to (6), further including:
an advance information generation unit that generates the advance information on the basis of metadata starting from the first scene in a recorded video captured in advance corresponding to the captured video.

(8)
The video processing apparatus according to (7), in which the advance information generation unit further generates the advance information on the basis of video data starting from the first scene in the recorded video.

(9)
The video processing apparatus according to (8), in which the advance information generation unit identifies the second scene by analyzing the metadata or the video data starting from the first scene in the recorded video.

(10)
The video processing apparatus according to (9), in which the advance information generation unit obtains the presentation timing on the basis of a time of the second scene identified after the first scene in the recorded video.

(11)
The video processing apparatus according to (10), in which
the presentation control unit compares the captured video with the recorded video to control presentation of the advance information in such a way that the advance information is presented at the presentation timing.

(12)
The video processing apparatus according to (11), in which
the presentation control unit compares metadata starting from the first scene in the captured video with the metadata starting from the first scene in the recorded video.

(13)
The video processing apparatus according to (12), in which
the presentation control unit compares time codes starting from the first scene in the captured video with time codes starting from the first scene in the recorded video.

(14)
The video processing apparatus according to (12) or (13), in which
the presentation control unit further compares video data starting from the first scene in the captured video with the video data starting from the first scene in the recorded video.

(15)
The video processing apparatus according to any one of (7) to (14), in which
the metadata includes at least one of time information, a camera parameter, information regarding a posture of a camera, a position of the camera, or sound information.

(16)
The video processing apparatus according to any one of (7) to (15), in which
the presentation control unit controls presentation of one or a plurality of representative frame images included in a range from the first scene to the second scene in the recorded video in accordance with the output destination, in addition to the advance information.

(17)
The video processing apparatus according to any one of (1) to (16), further including:
an output unit that outputs the advance information in a mode corresponding to the output destination to a display device serving as the output destination.

(18)
The video processing apparatus according to (1), in which
the presentation control unit displays, on a monitor, the advance information in a mode corresponding to the output destination.

(19)

The video processing apparatus according to (18), in which the presentation control unit displays, on the monitor, the advance information in a mode corresponding to the output destination selected in accordance with a selection operation by a user selecting the output destination.

(20)

A video processing method including:

controlling, by a video processing apparatus, in such a way that, with a first scene of a captured video currently being captured used as a reference, advance information regarding a second scene is presented at a presentation timing before the second scene after the first scene, in a mode corresponding to an output destination of the captured video, the presentation of the advance information.

REFERENCE SIGNS LIST

10 Camera
11 Memory
12 Imaging unit
13 Video processing unit
14 Output unit
15 Advance information generation unit
16 Metadata generation unit
17 Presentation control unit
18 Superimposition unit
19 Recording unit
110 Display device
111 I/F unit
112 Input unit
113 Presentation control unit
114 Monitor

The invention claimed is:

1. A video processing apparatus comprising:
presentation control circuitry configured to control, with a first scene of a captured video currently being captured used as a reference, presentation of advance information regarding a second scene at a presentation timing before the second scene and after the first scene, in a mode corresponding to an output destination of the captured video,
wherein the second scene is a scene that will be captured after the first scene is captured.

2. The video processing apparatus according to claim 1, wherein
the presentation control circuitry is configured to control superimposition of the advance information on the captured video.

3. The video processing apparatus according to claim 1, wherein
the advance information is information that prompts a user corresponding to the output destination to perform an operation for the second scene.

4. The video processing apparatus according to claim 3, wherein
the advance information is information for presenting, to the user, a change in metadata of the captured video in the second scene.

5. The video processing apparatus according to claim 4, wherein
the advance information is display information that includes at least one of a character, a symbol, or a figure.

6. The video processing apparatus according to claim 1, wherein the presentation timing of the advance information is set to a different timing for each of the output destinations.

7. The video processing apparatus according to claim 1, further comprising:
an advance information generation unit that generates the advance information on a basis of metadata starting from the first scene in a recorded video captured in advance corresponding to the captured video.

8. The video processing apparatus according to claim 7, wherein
the advance information generation unit further generates the advance information on a basis of video data starting from the first scene in the recorded video.

9. The video processing apparatus according to claim 8, wherein
the advance information generation unit identifies the second scene by analyzing the metadata or the video data starting from the first scene in the recorded video.

10. The video processing apparatus according to claim 9, wherein
the advance information generation unit obtains the presentation timing on a basis of a time of the second scene identified after the first scene in the recorded video.

11. The video processing apparatus according to claim 10, wherein
the presentation control circuitry is configured to compare the captured video with the recorded video to control the presentation of the advance information at the presentation timing.

12. The video processing apparatus according to claim 11, wherein
the presentation control circuitry is configured to compare metadata starting from the first scene in the captured video with the metadata starting from the first scene in the recorded video.

13. The video processing apparatus according to claim 12, wherein
the presentation control circuitry is configured to compare time codes starting from the first scene in the captured video with time codes starting from the first scene in the recorded video.

14. The video processing apparatus according to claim 12, wherein
the presentation control circuitry is further configured to compare video data starting from the first scene in the captured video with the video data starting from the first scene in the recorded video.

15. The video processing apparatus according to claim 7, wherein
the metadata includes at least one of time information, a camera parameter, information regarding a posture of a camera, a position of the camera, or sound information.

16. The video processing apparatus according to claim 7, wherein
the presentation control circuitry is configured to control presentation of one or a plurality of representative frame images included in a range from the first scene to the second scene in the recorded video in accordance with the output destination, in addition to the advance information.

17. The video processing apparatus according to claim 1, further comprising:
an output unit that outputs the advance information in a mode corresponding to the output destination to a display device serving as the output destination.

18. The video processing apparatus according to claim 1, wherein the presentation control circuitry is configured to displays, on a monitor, the advance information in a mode corresponding to the output destination.

19. The video processing apparatus according to claim 18, wherein the presentation control circuitry is configured to display, on the monitor, the advance information in a mode corresponding to the output destination selected in accordance with a selection operation by a user selecting the output destination.

20. A video processing method comprising:

controlling, by a video processing apparatus, with a first scene of a captured video currently being captured used as a reference, presentation of advance information regarding a second scene at a presentation timing before the second scene and after the first scene, in a mode corresponding to an output destination of the captured video, wherein the second scene is a scene that will be captured after the first scene is captured.

* * * * *